(12) United States Patent
Nakamura et al.

(10) Patent No.: US 6,487,265 B1
(45) Date of Patent: Nov. 26, 2002

(54) TREATMENT METHOD OF NUCLEAR REACTOR INTERNAL COMPONENT

(75) Inventors: Masato Nakamura, Hitachi (JP); Yamato Asakura, Hitachinaka (JP); Yoshiyuki Takamori, Hitachinaka (JP); Kazuhiko Akamine, Hitachinaka (JP); Katsumi Ohsumi, Hitachi (JP); Masanori Sakai, Hitachiohta (JP); Yoichi Wada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/610,869

(22) Filed: Jul. 6, 2000

(30) Foreign Application Priority Data

| Jul. 9, 1999 | (JP) | ................................. | 11-195383 |
| Aug. 19, 1999 | (JP) | ................................. | 11-232128 |
| Jan. 27, 2000 | (JP) | ................................. | 2000-023282 |

(51) Int. Cl.$^7$ ................................. G21C 9/00
(52) U.S. Cl. ................................. 376/305; 376/309
(58) Field of Search ................................. 376/260, 277, 376/308, 309, 313, 310, 315

(56) References Cited

U.S. PATENT DOCUMENTS

| 3,013,909 A | * | 12/1961 | Pancer et al. | .................. 134/27 |
| 3,783,005 A | * | 1/1974 | Kenney | ....................... 205/126 |
| 4,123,594 A | * | 10/1978 | Chang | ......................... 428/651 |
| 4,762,671 A | * | 8/1988 | Kobayashi et al. | .......... 134/113 |
| 4,800,063 A | * | 1/1989 | Mierswa et al. | ............. 376/310 |
| 4,917,968 A | * | 4/1990 | Tuffias et al. | ................ 428/610 |
| 5,093,073 A | * | 3/1992 | Schenker | ..................... 376/305 |
| 5,164,152 A | * | 11/1992 | Kim et al. | .................... 376/301 |
| 5,377,245 A | | 12/1994 | Uetake et al. | ............... 376/305 |
| 5,434,331 A | * | 7/1995 | Barkatt et al. | ................. 134/10 |
| 5,608,766 A | | 3/1997 | Andresen et al. | ............ 376/305 |
| 5,724,668 A | * | 3/1998 | Wood et al. | .................... 134/10 |
| 5,814,204 A | * | 9/1998 | D'Muhala | .................... 205/705 |
| 6,147,274 A | * | 11/2000 | Wood et al. | .................... 134/10 |

FOREIGN PATENT DOCUMENTS

| JP | A-198893/1995 | 8/1995 |
| JP | 2818943 | 8/1998 |

* cited by examiner

Primary Examiner—Charles T. Jordan
Assistant Examiner—Judith A Nelson
(74) Attorney, Agent, or Firm—McDermott, Will & Emery

(57) ABSTRACT

Surfaces of the structural components of a nuclear power plant exposed to reactor water are wetted with an electroless plating solution containing an electrical insulating substance. The electrical insulating substance has a high resistivity about $10^5$ (100000) times those of the structural components of the nuclear power plant or above. A metal film containing the electrical insulating substance is formed on the surfaces of the structural components exposed to the reactor water by wetting the surfaces of the structural components with the electroless plating solution. Thus, the electrochemical corrosion potential of the structural components is reduced regardless of whether hydrogen is injected into the reactor water.

17 Claims, 15 Drawing Sheets

TREATMENT METHOD OF NUCLEAR REACTOR INTERNAL COMPONENT

BACKGROUND OF THE INVENTION

The present invention relates to a method of surface-treating internal components of a nuclear reactor, and a nuclear power plant and, more particularly, to techniques for inhibiting the corrosion of internal components of a nuclear reactor exposed to reactor water.

Injection of hydrogen into reactor water is used prevalently as one of many methods to cope with mitigate IGSCC (intergranular stress-corrosion cracking) in the internal components of a reactor or pipes in a nuclear power plant. A large amount of hydrogen needs to be injected into reactor water to reduce the IGSCC potential below a critical potential. The critical potential of a stainless steel forming most of the structural components of a reactor, such as a reactor pressure vessel, is in the range of −230 to −300 $mV_{vs}SHE$. Increase in the amount of hydrogen injected into reactor water involves increase in the amount of radioactive nitrogen that enters a main steam system and increases main steam dose rate. Hereinafter, structural components of a nuclear reactor will be referred to as reactor internal components.

This problem can be solved by noble metal injection, i.e., injection of a solution containing a noble metal into reactor water, mentioned in Japanese Pat. No. 2818943 and Japanese Patent Laid-open No. Hei 7-198893. The noble metal injected into reactor water deposits on the surfaces of the nuclear internal components including the components of the reactor pressure vessel and the reactor. An anodic reaction causing the oxidation of hydrogen is promoted by the catalytic effect of the noble metal, such as Pt, Rh or Pd. In a state where the noble metal is injected into reactor water, as compared with a state where any noble metal is not injected into reactor water, the electrochemical corrosion potential of the nuclear internal components can be reduced below the. critical potential by injecting a less amount of hydrogen into reactor water. However, noble metal injection needs at least hydrogen injection while the nuclear power plant is in normal operation. Although a method that injects an organometallic compound into reactor water does not need additional hydrogen injection while reactor water contains organic substances, the methods needs the reduction of electrochemical corrosion potential by hydrogen injection to keep the electrochemical corrosion potential on a low level.

SUMMARY OF THE INVENTION

It is an object of the present invention to provide a method of surface-treating internal structural components of a nuclear power plant and a nuclear power plant, capable of reducing the electrochemical corrosion potential (ECP) of the internal structural components of the nuclear power plant regardless of whether hydrogen is injected into reactor water.

According to a first aspect of the present invention, a method of surface-treating a reactor internal component of a nuclear power plant wets the surfaces of the reactor internal components to be exposed to reactor water with an electroless plating solution containing an electrical insulating substance. In other words, this method brings the surface of the reactor internal components into contact with the reactor water with the electroless plating solution. The electrical insulating substance has a resistivity about $10^5$ (100000) times that of the reactor internal components or above. When the surfaces of the reactor internal components are wetted with the electroless plating solution, a metal film containing the electrical insulating substance is formed on the surfaces of the reactor internal components exposed to reactor water. Consequently, the electrochemical corrosion potential of the reactor internal components can be reduced regardless of whether hydrogen is injected into reactor water. The metal film containing the electrical insulating substance suppresses the growth of an oxide film on the surfaces of the reactor internal components exposed to reactor water by wet corrosion. Thus, the metal film suppresses increase in the surface dose rate of the reactor internal components due to increase in the inclusion of radioactive ions contained in reactor water in the oxide film as the oxide film grows due to wet corrosion.

According to a second aspect of the present invention, wets the surfaces of reactor internal components exposed to reactor water with an electroless plating solution containing an oxide having a lattice oxygen anion diffusing property. When the surfaces of the reactor internal components are wetted with the electroless plating solution, a metal film containing the oxide having a lattice anion diffusing property is formed on the surfaces of the reactor internal components. Since oxygen is supplied to the metal in contact with the oxide by the agency of the lattice anion diffusing property of the oxide, the metal not exposed to reactor water is oxidized by dry corrosion. Consequently, the electrochemical corrosion potential of the reactor internal components can be kept on a low level for a long period of time regardless of whether hydrogen is injected into reactor water. Since the oxide film formed by dry oxidation suppresses the growth of an oxide film on the surfaces of the reactor internal components exposed to reactor water due to wet oxidation, increase in the surface dose of the-reactor internal components can be suppressed.

According to a third aspect of the present invention, the surfaces of reactor internal components exposed to reactor water are wetted with an electroless plating solution containing at least either an electrical insulating substance or an oxide having a lattice oxygen anion diffusing property (hereinafter referred to as "electrical insulating substance or the like") after the chemical decontamination of the reactor internal component. Since a metal film containing an electrical insulating substance or the like is formed on the surfaces of the reactor internal components exposed to reactor water, the electrochemical corrosion potential of the reactor internal components can be reduced regardless of whether hydrogen is injected into reactor water, and increase in the surface dose rate of the reactor internal components can be suppressed. Since corrosion products deposited on the surfaces of the reactor internal components can be removed by chemical decontamination, the metal film containing the electrical insulating substance or the like can be more uniformly formed.

According to a fourth aspect of the present invention, an electroless plating solution supply system having an injection nozzle for injecting an electroless plating solution containing at least an electrical insulating substance or the like is disposed between a reactor vessel and a reactor vessel flange, and the electroless plating solution supply system injects the electroless plating solution into the reactor pressure vessel.

According to a fifth aspect of the present invention, a metal film containing an electrical insulating substance or the like is formed on at least either a surface of a reactor vessel exposed to reactor water or surfaces of reactor internal components exposed to reactor water.

DESCRIPTION OF THE PREFERRED EMBODIMENTS

Figure 1:
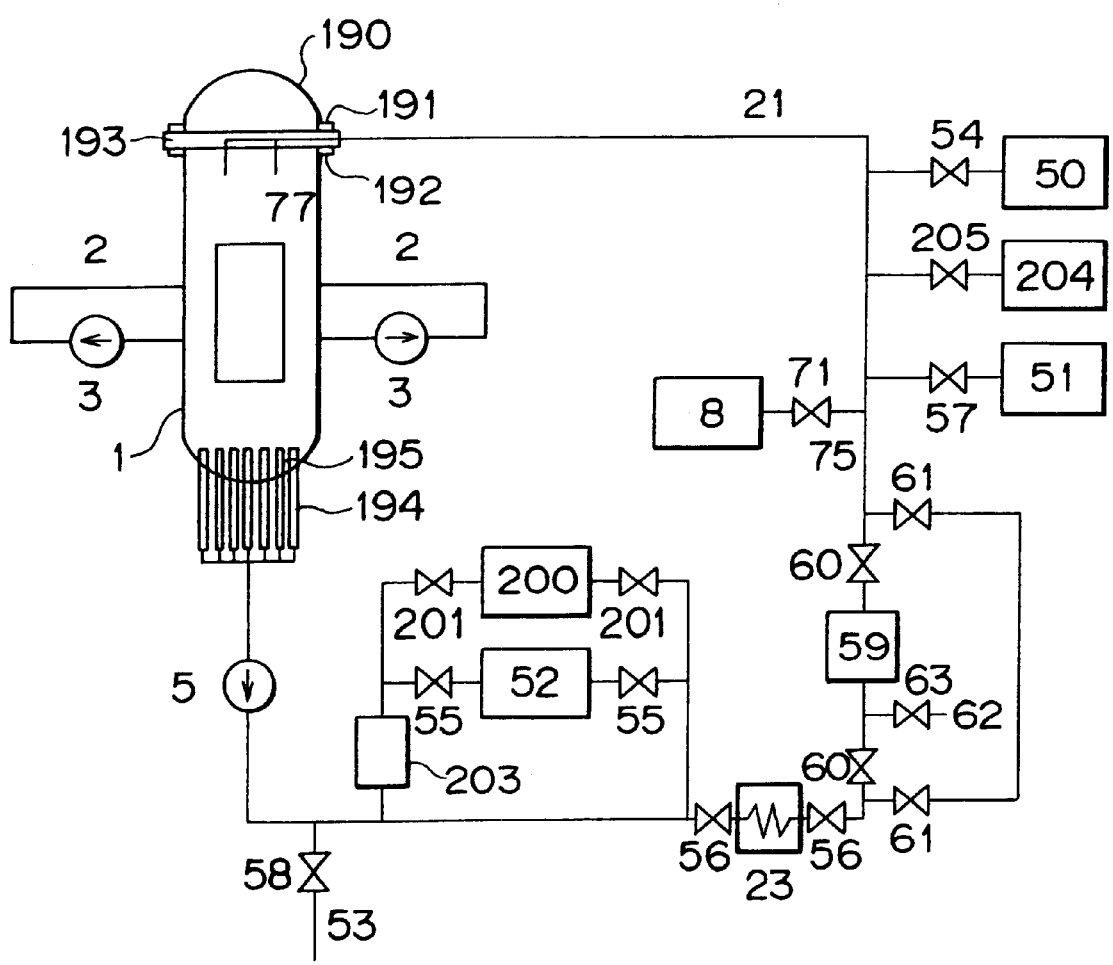
FIG. 1 is a diagrammatic view of a temporary electroless plating pipe system to be used by a first embodiment according to the present invention.

Hydrogen, although only a small amount of hydrogen, must be injected into reactor water when injecting a noble metal into the reactor water. A method that injects an organometallic compound into reactor water needs hydrogen injection to keep ECP on a low level.

The inventors of the present invention studied various methods that reduces the ECP of a reactor internal component without requiring hydrogen injection and found that the ECP of a reactor internal component can be reduced by forming a metal layer, such as a Ni layer, containing an electrical insulating substance, such as $ZrO_2$, on a surface of the reactor internal component exposed to reactor water. The electrical insulating substance has a resistivity about $10^5$ (100000) times that of the reactor internal component or above. The present invention has been made on the basis of this finding. The inventors of the present invention also found that the metal layer containing an electrical insulating substance can be formed by electroless plating. Results of the studies will be concretely described hereinafter.

A plate-shaped test piece of 10 mm×20 mm×2 mm was suspended in an electroless plating solution, i.e., a suspension, contained in a beaker. The electroless plating solution was stirred by a stirrer during an electroless plating process. The electroless plating solution contained one liter of water, 30 g of nickel sulfate, 10 g of sodium acetate, 10 g of sodium hypophosphite and 25 g of zirconium oxide ($ZrO_2$) particles of 1 μm in mean particle size (diameter). In the following description, the electroless plating solution containing $ZrO_2$ particles will be referred to simply as "electroless plating solution". A stainless steel plate (a plate of SUS304, JIS) was dipped in the electroless plating solution for 5 h for an electroless plating process. During the electroless plating process, the electroless plating solution was heated at 90° C. and was stirred by a stirrer. A Ni film containing $ZrO_2$ particles was formed on the surface of the stainless steel plate by the electroless plating process.

Results of studies made by the inventors showed that a desirable electroless plating solution contains one liter of water, 10 to 50 g of nickel sulfate, 5 to 20 g of sodium acetate, 5 to 20 g of sodium hypophosphite and 0.1 to 5% by weight $ZrO_2$ particles. A preferable plating time is in the range of 0.5 to 20 h (hour). A desirable process temperature is in the range of 60 to 98° C. Thus, the Ni film containing $ZrO_2$ particles can be formed on the surface of the stainless steel plate. It is inferred that a Ni film containing $ZrO_2$ particles can be formed by using any one of generally known electroless nickel plating solutions containing $ZrO_2$ particles. Nickel nitrate may be used instead of nickel sulfate for the same effect.

When measuring ECP (Electrochemical Corrosion Potential), the stainless steel plate having the Ni film containing $ZrO_2$ particles, a solid stainless steel plate (SUS304, JIS) and a Pt plate were dipped in water having a dissolved oxygen concentration of 200 ppb and heated at 280° C. The flow rate of the water was about 1 cm/s. Hydrogen was not injected into the water during ECP measurement.

Figure 8:
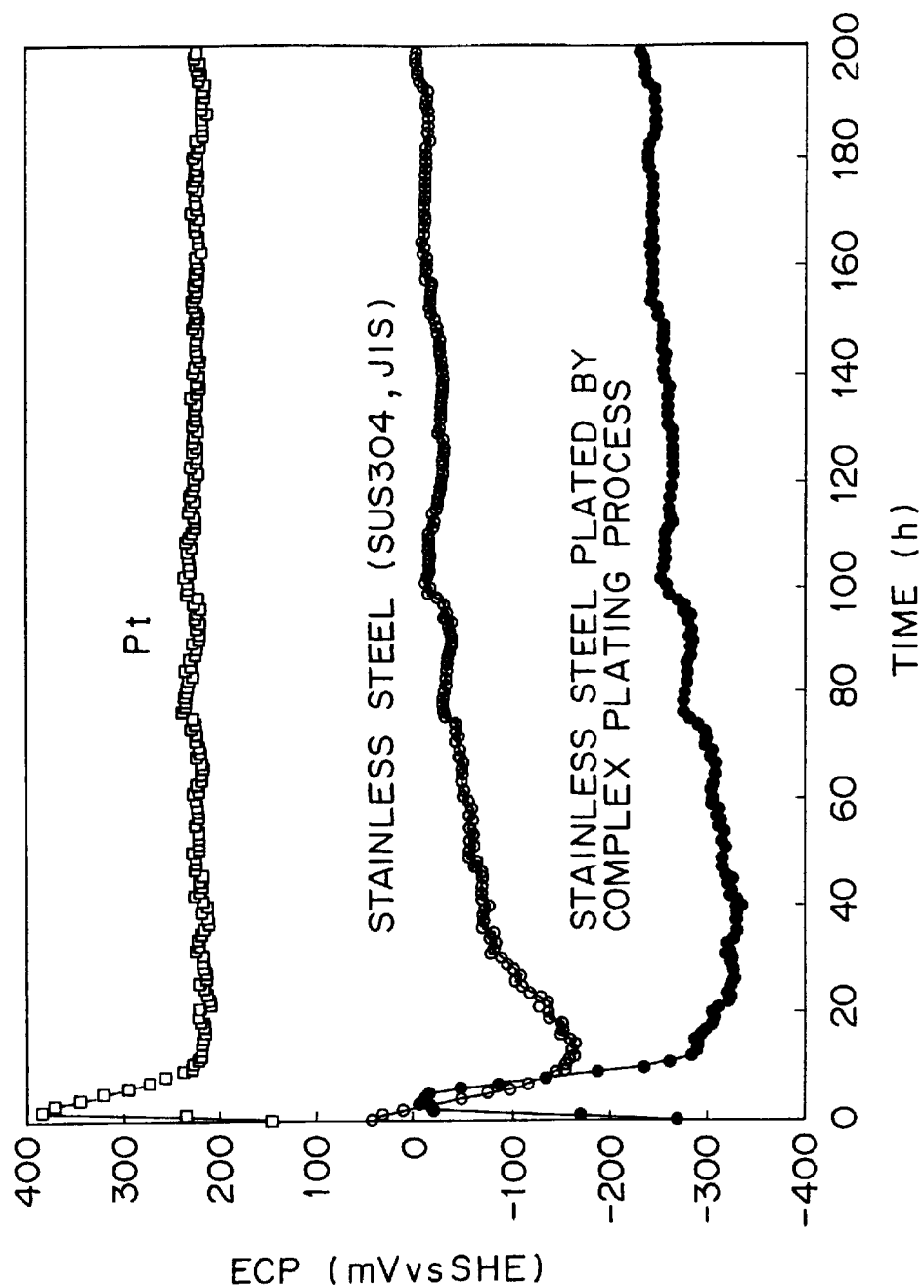
FIG. 8 is a graph showing the variation of the electrochemical corrosion potential of SUS304 (JIS)
Figure 9:
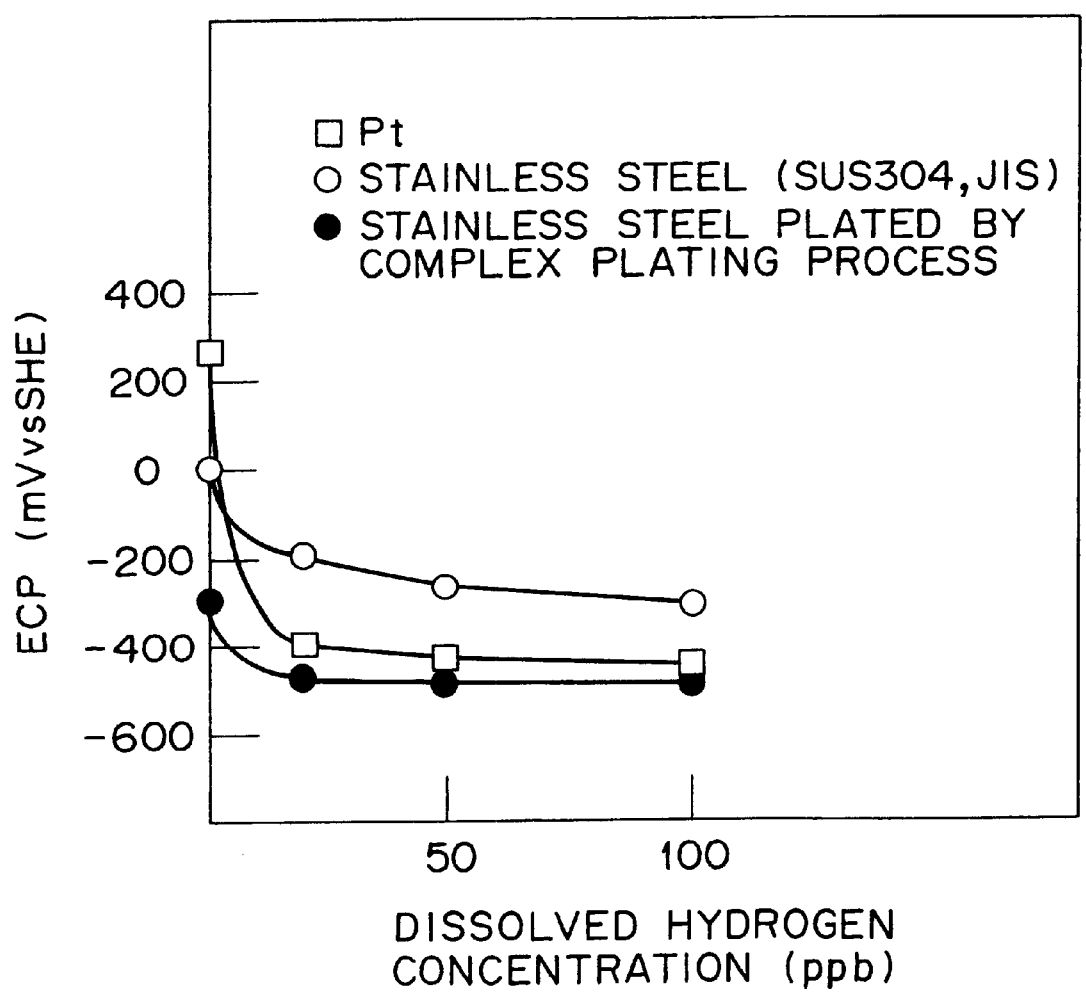
FIG. 9 is a graph showing the dependence of the electrochemical corrosion potential of SUS304 (JIS) on dissolved hydrogen concentration.

FIG. 8 shows the measured ECPs of those plates. The ECP of the stainless steel plate (solid circle) processed by the electroless plating process is reduced remarkably as compared with that of the solid stainless steel plate (blank circle). FIG. 9 shows the ECPs of the three kinds of plates when hydrogen is injected into the water in which those three kinds of plates are dipped during ECP measurement. When the water contains hydrogen, the ECP of the Pt plate is reduced nearly to the stainless plate processed by the electroless plating process.

The ECP of the stainless steel processed by the electroless plating process is far less than a critical potential of −230 $mV_{vs}SHE$ at which stress-corrosion cracking does not occur even if hydrogen is not injected into the water. Since the ECP of the stainless steel plate can be reduced without hydrogen injection, the dose rate of a main steam system does not increase when the reactor internal components of a nuclear power plant are plated by the electroless plating process.

As shown in FIG. 9, the stainless steel plate processed by the electroless plating process has a low ECP even if hydrogen is not dissolved in the water. However, it was found that the ECP of the stainless steel plate is reduced nearly to the equilibrium potential between water not containing any oxidizer and a stainless plate if the water contains dissolved hydrogen.

Figure 10:
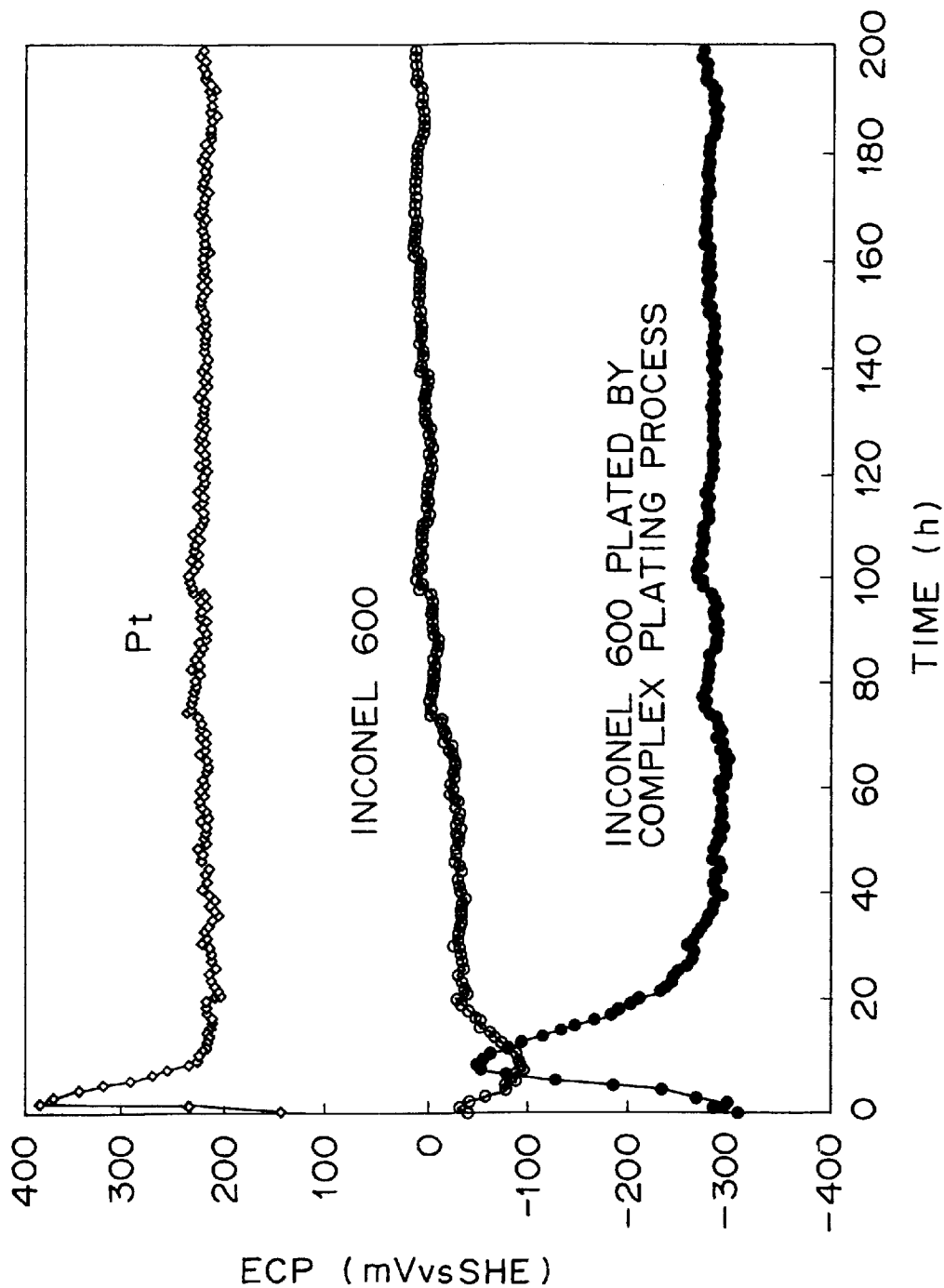
FIG. 10 is a graph showing the dependence of the electrochemical corrosion potential of Inconel 600 on dissolved hydrogen concentration.
Figure 11:
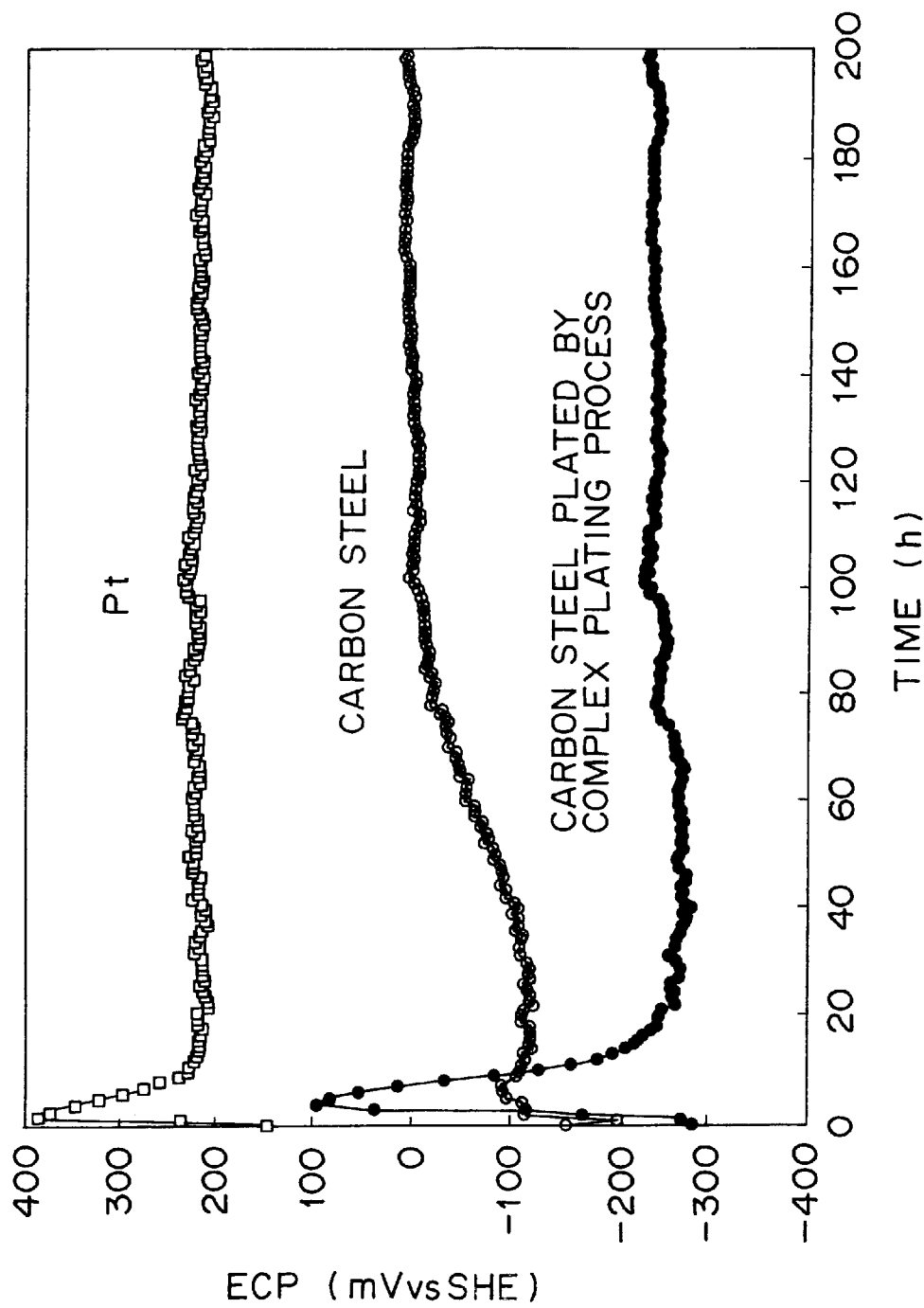
FIG. 11 is a graph showing the dependence of the electrochemical corrosion potential of a carbon steel on dissolved hydrogen concentration.

The ECPs of a nickel-base alloy (Inconel 600) plate processed by the electroless plating process and a solid nickel-base alloy (Inconel 600) plate were measured by the same procedure as mentioned above. Measured results are shown in FIG. 10. FIG. 11 shows the measured ECPs of a carbon steel plate processed by the electroless plating process and a solid carbon steel plate. The ECPs of the nickel-base alloy plate processed by the electroless plating process and the carbon steel plate processed by the electroless plating process are reduced remarkably. It was confirmed from those results that the ECPs of components can be remarkably reduced without hydrogen injection regardless of the material of the components when the surfaces of the components are coated with a nickel film containing $ZrO_2$ particles. The effect of the electroless plating process on cobalt-base alloy components and titanium-base alloy components is the same as that on the stainless steel components.

Some examples of application of electroless plating to a reactor pressure vessel installed in a nuclear power plant will be described. A Ni layer containing $ZrO_2$ particles, i.e., an electrical insulating substance, is formed on the surfaces of reactor internal components of a stainless steel as a base metal exposed to reactor water by supplying the foregoing electroless plating solution into a reactor pressure vessel. The Ni layer reduces the ECPs of the reactor internal components and suppresses the adhesion of radioactive substances to the surfaces of the reactor internal components.

The cause of effect of the Ni layer on reduction of ECP and suppression of adhesion of radioactive substances to the reactor internal components will be described. When the electroless plating solution containing particles of an electrical insulating substance, such as $ZrO_2$ particles, is supplied into the reactor, a Ni layer containing $ZrO_2$ particles is formed on the surfaces of reactor internal components exposed to reactor water. When the Ni layer containing $ZrO_2$ particles is exposed to hot water of 100° C. or above, the Ni layer is oxidized gradually, Ni ions eluted into the reactor water are chemically combined with Fe ions eluted from the material, such as a stainless steel, forming the reactor internal components, and the Ni layer changes into a Ni—Fe complex oxide layer ($NiFe_2O_4$ layer).

On the other hand, since $ZrO_2$ particles are highly chemically stable, the $ZrO_2$ particles remain chemically unchanged. Consequently, the surfaces of the reactor internal components exposed to reactor water are coated with a Ni—Fe complex oxide ($NiFe_2O_4$) and $ZrO_2$ particles. Zirconium oxide ($ZrO_2$) is added previously to the electroless plating solution. Therefore, the Ni layer will not be strained and will not crack due to expansion resulting from the oxidation of Zr when the Ni layer is exposed to hot water. Thus, a dense, stable Ni layer containing $ZrO_2$ particles can be formed.

$NiFe_2O_4$ is chemically stable in reactor water and dissolves scarcely in reactor water. Since the dense, corrosion-resistant oxide layer is formed on the surfaces of the reactor internal components exposed to reactor water, The direct contact of reactor water with the reactor internal components can be prevented. Consequently, the electrochemical dissolving reaction, i.e., a reaction in which metal atoms emit electrons and change into metal ions expressed by: $M \rightarrow M^+ + e$, of the base metal of the reactor internal components is suppressed and the growth of an oxide film due to wet corrosion on the surfaces of the reactor internal components is suppressed.

Radioactive ions contained in reactor water are included in an oxide film formed by wet corrosion as the oxide film grows and increases the surface dose rate of the reactor internal components. Since the $NiFe_2O_4$ layer containing $ZrO_2$ particles suppresses the formation of an oxide film by wet corrosion, increase in the surface dose rate is suppressed. Since the resistivity of $NiFe_2O_4$ is far less than that of an electrical insulating substance, such as $ZrO_2$, the effect of the $NiFe_2O_4$ layer on the suppression of electrochemical cathodic reaction, i.e., a reductive reaction in which oxygen and hydrogen peroxide contained in reactor water receive electrons, is insignificant. Therefore, only the $NiFe_2O_4$ layer is ineffective in reducing ECP dependent on the balance of cathodic reaction and anodic reaction.

$ZrO_2$ particles dissolves in reactor water of temperatures in the range of a room temperature to about 280° C. at which reactor water is heated during the rated operation of the reactor (hereinafter referred to as "reactor water temperature range") and have a high resistivity about $10^9$ (1000000000) times those of $NiFe_2O_4$ and the reactor internal components or above in the reactor water temperature range. Therefore, $ZrO_2$ particles high effect in electrically insulating the reactor internal components and suppresses cathodic reaction effectively. Thus, the $NiFe_2O_4$ layer containing $ZrO_2$ particles suppresses local corrosion and ECP dependent on the balance of cathodic reaction and anodic reaction is reduced.

The resistivity of the $NiFe_2O_4$ layer containing $ZrO_2$ particles increases with the increase of $ZrO_2$ particle content. Since $ZrO_2$ has a high resistivity, the $NiFe_2O_4$ layer containing $ZrO_2$ particles of 1 μm or below in particle size has a sufficiently high resistivity. Since fine particles of $ZrO_2$ are held stably in the dense, fine crystals of $NiFe_2O_4$, the $NiFe_2O_4$ layer containing $ZrO_2$ particles has a high durability and is capable of exercising corrosion suppressing effect for a long period of time.

Although $ZrO_2$ particles have been described as an example of particles of an electrical insulating substance, the same effect as that can be exercised when $ZrO_2$ is employed can be exercised by employing an inorganic, solid electrical insulating substance, such as $TiO_2$, $Al_2O_3$ or $SiO_2$. These metal oxides have a resistivity in the reactor water temperature range about $10^5$ (100000) times or above that of the reactor internal components or higher.

Figure 4:
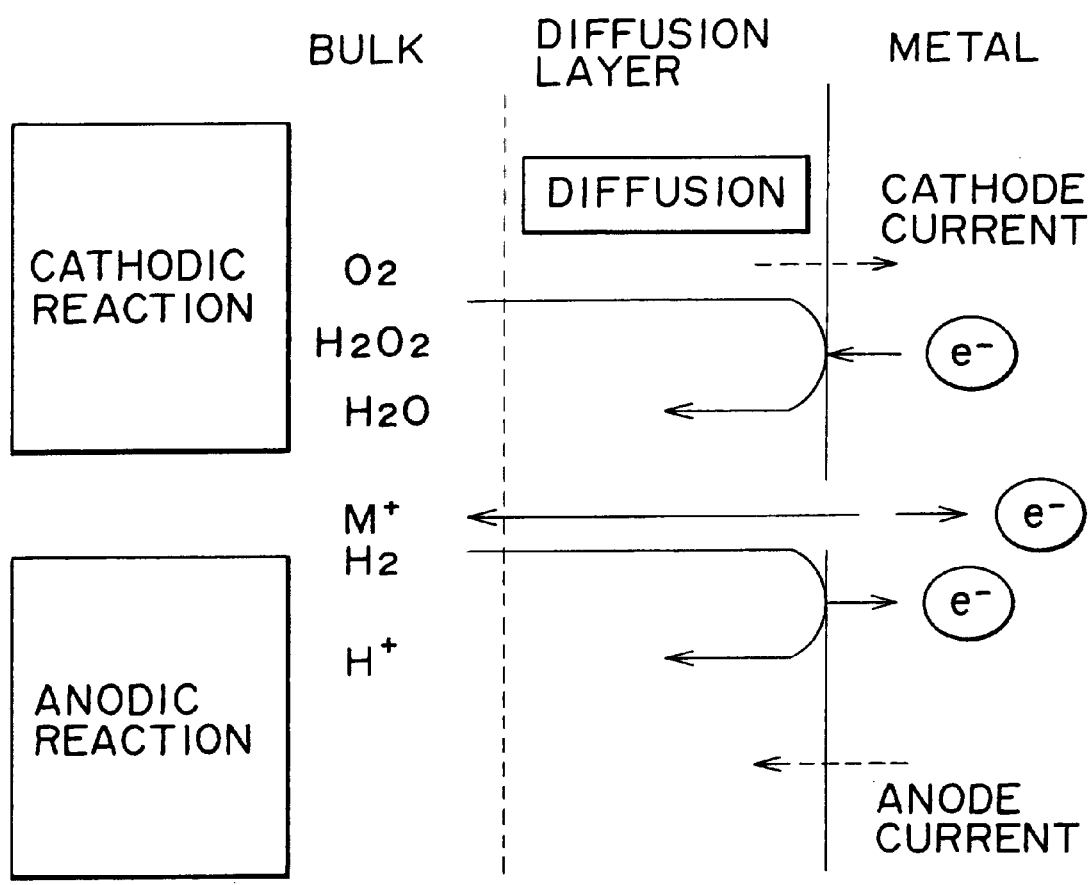
FIG. 4 is a diagrammatic view of assistance in explaining a phenomenon that occur on the surface of a metal piece.

The principle of ECP reduction will be described. The ECP of a metal piece is dependent on the balance of cathodic reaction and anodic reaction on the metal piece. As shown in FIG. 4, electron donation and acceptance occur through a diffusion layer. Electron donation and acceptance are achieved by an anodic reaction that supplies electrons and a cathodic reaction that accepts electrons. At an anode, an oxidizing reaction occurs, whereby a metal piece is dissolved ($M \rightarrow M^+ + e$) or hydrogen is oxidized ($H_2 \rightarrow 2H^+ + 2e$). At a cathode, a reductive reaction occurs, whereby the cathode accepts electrons, and oxygen and hydrogen peroxide are reduced. Generally, known cathodic and anodic reactions are expressed by the following expressions.

Anodic Reactions $$M \rightarrow M^+ + e$$

$$H_2 2H^+ + 2e$$

$$M + H_2O \rightarrow MO + 2H^+ + 2e$$

Cathodic Reactions $$O_2 + 4e + 4H^+ \rightarrow 2H_2O$$

$$H_2O_2 + 2e + 2H^+ \rightarrow 2H_2O$$

Figure 5:
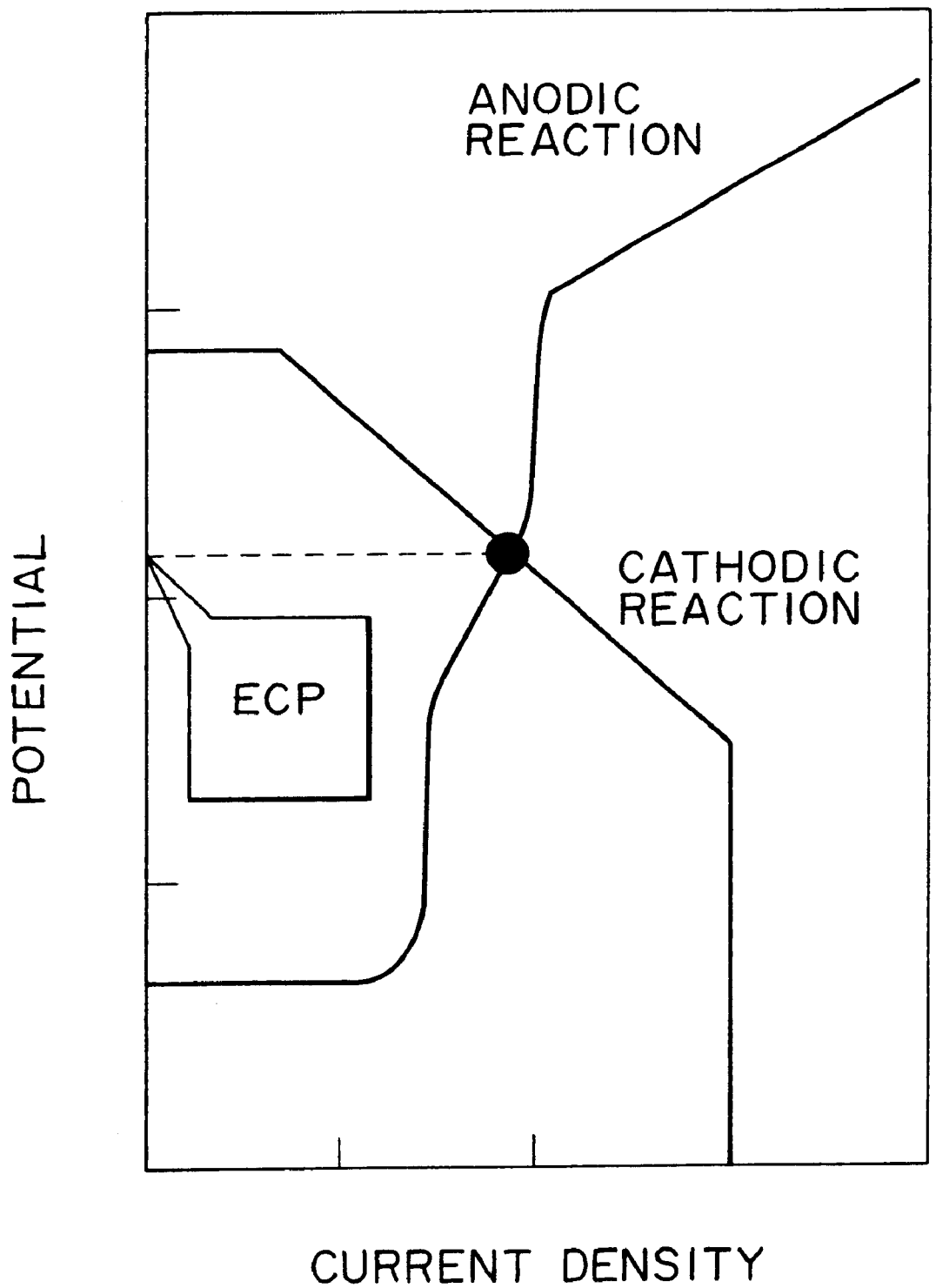
FIG. 5 is a diagram of assistance in explaining electrochemical corrosion potential.

A potential at which the anodic reaction and the cathodic reaction are balanced and electron donation and acceptance is equilibrated as shown in FIG. 5 is called an ECP.

Figure 6:
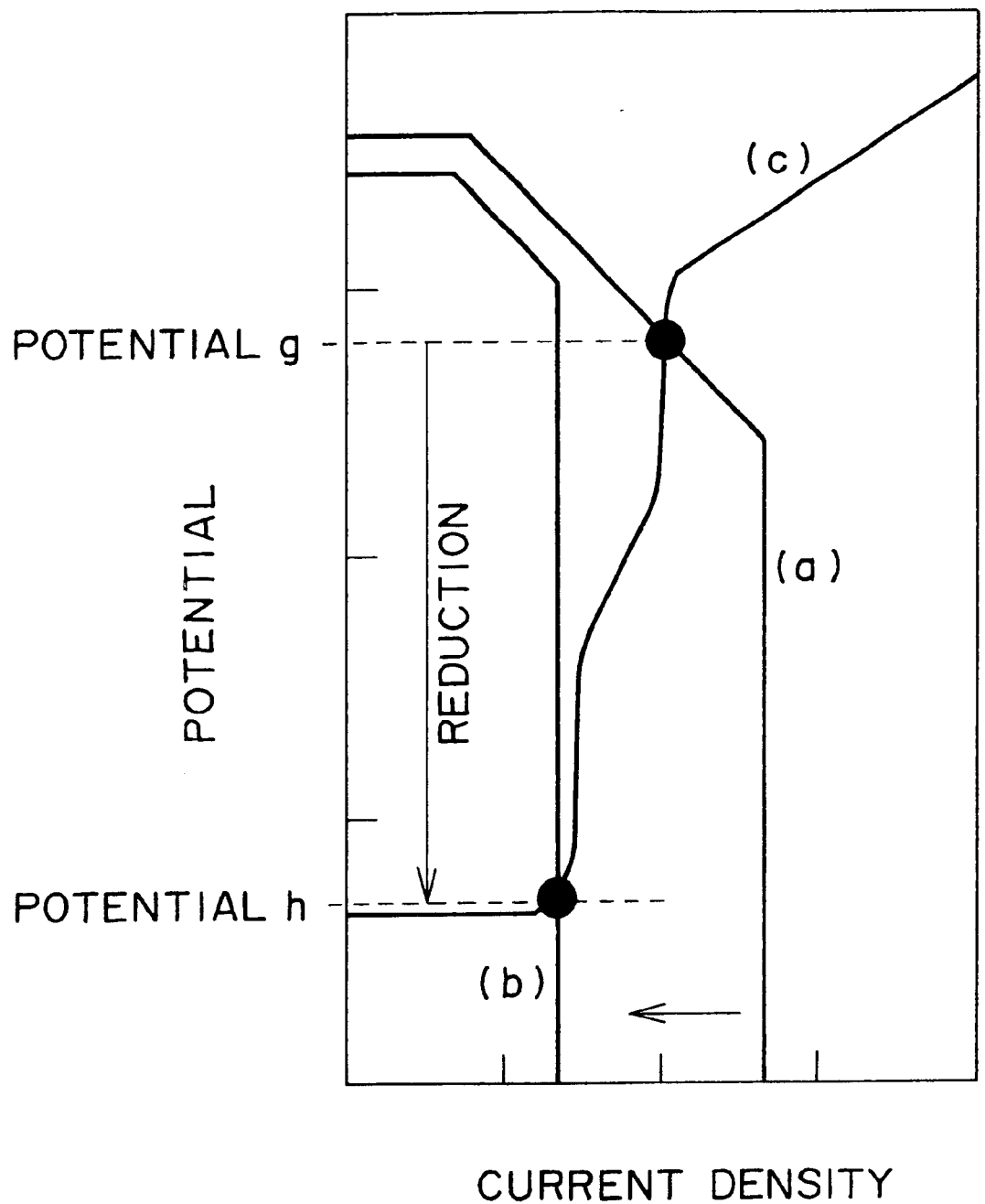
FIG. 6 is a diagram of assistance in explaining the reduction of electrochemical corrosion potential of $ZrO_2$.

Zirconium oxide ($ZrO_2$) has a high electrical insulating property and hence $ZrO_2$ suppresses cathodic reaction extremely. Therefore, a potential-current density curve for a cathodic reaction changes from a curve (a) to a curve (b) as shown in FIG. 6. Consequently, ECP drops from a potential g to a potential h.

Figure 13:
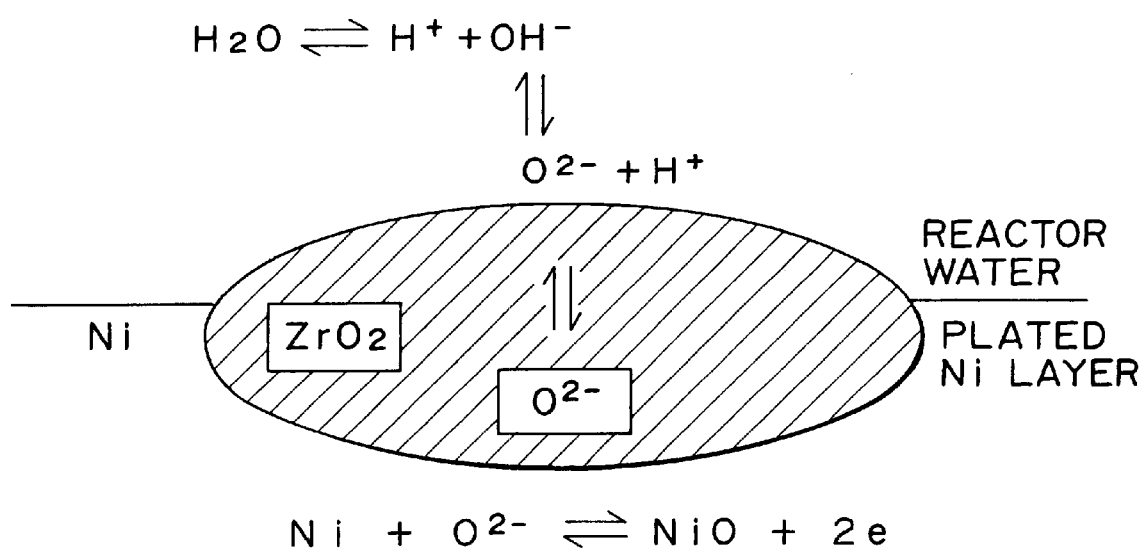
FIG. 13 is diagrammatic view of assistance in explaining an elementary reaction that occurs around $ZrO_2$ in contact with reactor water.

$ZrO_2$ particles in contact with reactor water causes the following potential reducing mechanism. $ZrO_2$ particles contained in the electroless plating solution have a low solubility in hot water and are oxide having a lattice anion diffusing property. Therefore, in the surface of a plated layer, oxygen ions $O^{2-}$ moves through $ZrO_2$ particles as shown in FIG. 13 and reactions expressed by Expressions 1 to 4 occur. Water and hydroxyl ions are dissociated (Expressions (1) and (2)) in water and oxygen ions $O^{2-}$ are produced. Since $ZrO_2$ has voids for oxygen ions $O^{2-}$), oxygen ions move in the lattices of Zr. Upon contact with the surface of a $ZrO_2$ particle, the oxygen ions ($O^{2-}$) produced in reactor water move to the interface between Zr and Ni as expressed by Expression (3). The oxygen ions moved to the interface between $ZrO_2$ and Ni react with. Ni to form an oxide as expressed by Expression (4)

$$H_2O \rightleftharpoons H^+ + OH^- \quad (1)$$

$$OH^- \rightleftharpoons O^{2-} + H^+ \quad (2)$$

$$O^{2-}(\text{reactor water side}) \rightleftharpoons O^{2-}(\text{Ni side}) \quad (3)$$

$$Ni + O^{2-} \rightleftharpoons NiO + 2e \quad (4)$$

Since oxygen ions ($O^{2-}$) are supplied through $ZrO_2$ particles in contact with reactor water to Ni around the $ZrO_2$ particles, the oxidation of Ni not in contact with reactor water is promoted. Consequently, an anodic reaction expressed by Expression (5) is promoted.

$$Ni + H_2O \rightleftharpoons NiO + 2H^+ + 2e \quad (5)$$

Figure 14:
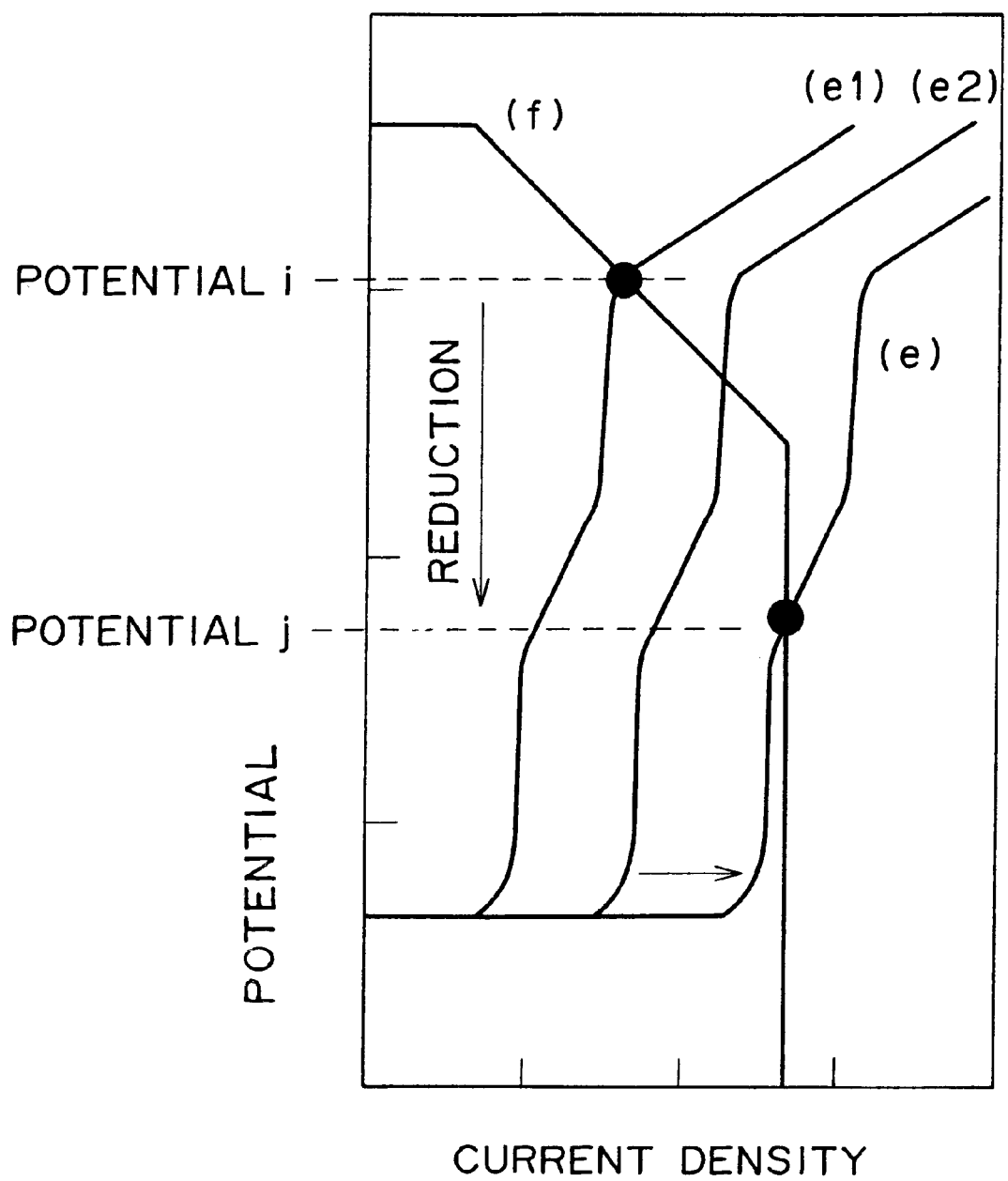
FIG. 14 is a diagram showing the reduction of the ECP of $ZrO_2$ in contact with reactor water.

Referring to FIG. 14, a current on an anode curve (e2) expressed by Expression (5) for a potential is higher than a current on an anode curve (e1) for a stainless steel anode for the same potential. Therefore, when the stainless steel is plated, the anode curve for the stainless steel changes to an anode curve (e). Consequently, the ECP dependent on the balance of the cathodic reaction and the anodic reaction drops from a potential i to a potential j.

Although $ZrO_2$ particles have been described as an example of oxide particles having a lattice oxygen anion diffusing property, inorganic oxides having a lattice anion diffusing property, such as $TiO_2$, $SiO_2$ and $Al_2O_3$, may be used for the same effect.

Figure 7:
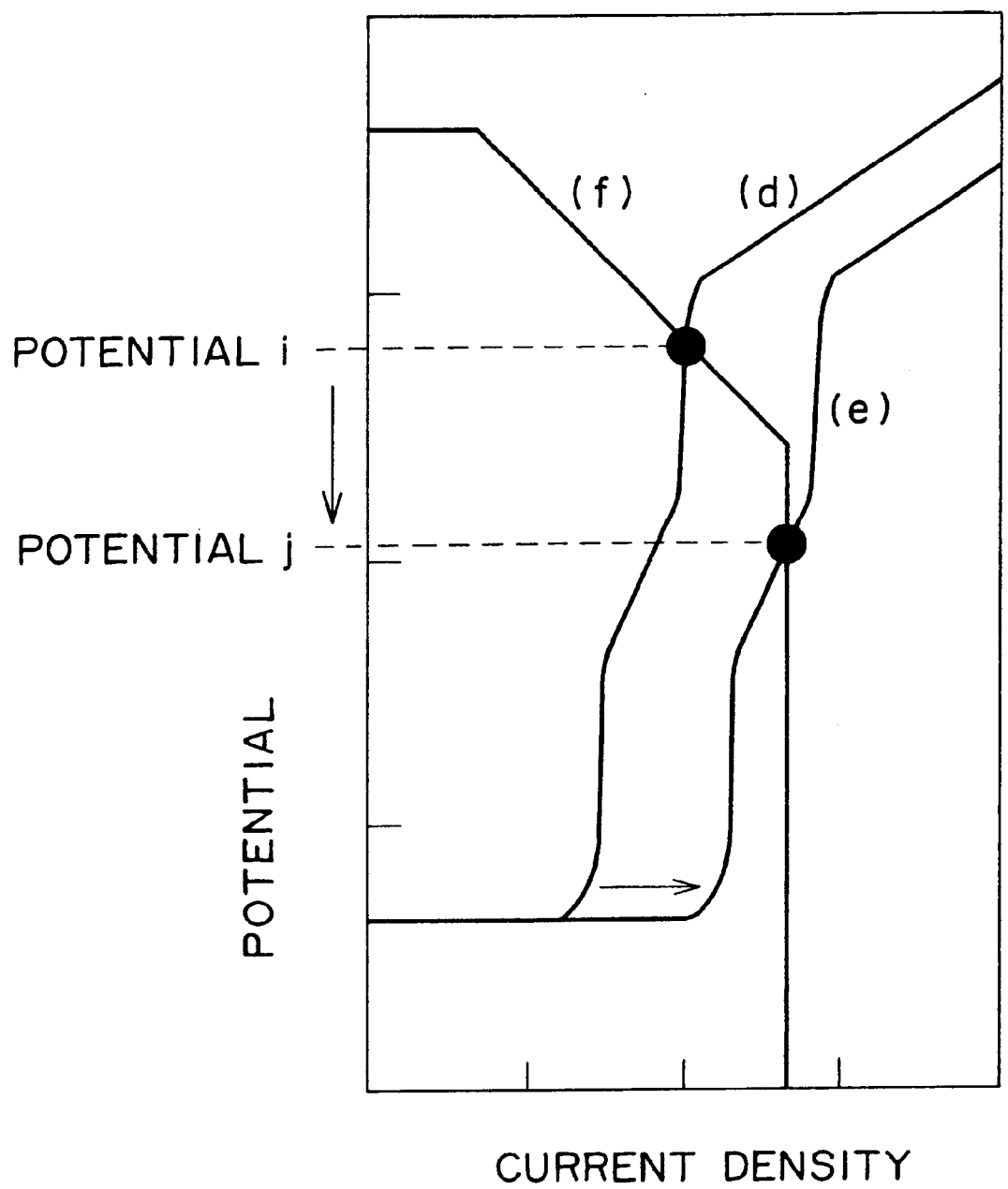
FIG. 7 is a diagram of assistance in explaining the effect of a noble metal on the reduction of electrochemical corrosion potential.

When noble metal is injected into reactor water as mentioned in Japanese Pat. No. 2818943 and Japanese Patent Laid-open No. Hei 7-198893, a hydrogen oxidizing reaction ($H_2 \rightleftharpoons 2H^+ + 2e$) is promoted on the noble metal deposited on the structural material. Since electrons are emitted frequently at the same potential of reaction, anodic reaction changes from a mode indicated by an potential-current density curve (d) to a mode indicated by a potential-current density curve (e) as shown in FIG. 7. A potential-current density curve (f) indicating a cathodic reaction, as compared with the potential-current density curve indicating an anodic reaction, does not change greatly. Consequently, the ECP drops from a potential i to a potential j. However, since hydrogen oxidizing reaction does not proceed or promote when hydrogen does not exist in reactor water, any change of anodic reaction like the change from the curve (d) to the curve (e) does not occur and ECP does not drop. Therefore noble metal injection into reactor water as mentioned in Japanese Pat. No. 2818943 and Japanese Patent Laid-open No. Hei 7-198893 is unable to exercise an ECP reducing effect unless the same is used in combination with hydrogen injection into reactor water.

The method of forming the $NiFe_2O_4$ layer containing $ZrO_2$ particles coats the surface of the base material densely with $ZrO_2$ particles having an electrical insulating property and is capable of sufficiently reducing the ECP of the base metal. More concretely, the ECP of the base material can be reduced to $-230$ mV$_{vs}$SHE or below by forming the $NiFe_2O_4$ layer containing $ZrO_2$ particles on the base material. Since the formation of an oxide film by the wet corrosion of the base material is suppressed, the adhesion of radioactive substances on the base material can be suppressed.

Examinations made by the inventors showed that it is preferable to form the plated layer in a thickness in the range of 1 to 30 $\mu$m to achieve the foregoing effects. Desirable $ZrO_2$ particles have a mean particle size in the range of 0.1 to 3 $\mu$m. Desirably, the mean particle size of the $ZrO_2$ particles is 30% of the thickness of the plated layer or below, more desirably, 10% or below.

Preferred embodiments of the present invention applied to a boiling water reactor nuclear power plant (hereinafter referred to as "BWR plant") will be described hereinafter.

First Embodiment

A method of surface-treating internal components in a first embodiment according to the present invention carries out an electroless plating process while a BWR nuclear power plant is in regular inspection. A temporary pipe system as shown in FIG. 1 is installed in the BWR nuclear power plant, the reactor is cleaned by chemical decontamination, and electroless plating is carried out by using the temporary pipe system. This embodiment carries out an electroless plating process to plate the internal components of a reactor pressure vessel (abbreviated to "RPV") 1 containing a reactor and the inner surfaces of pipes 2 of a reactor recirculation pipe system for circulating reactor water through the RPV 1. The RPV 1 is one of reactor vessels.

The steps of the method will be explained. In the regular inspection of the BWR nuclear power plant, all the fuel assemblies, control rods, control rod driving mechanism (hereinafter abbreviated to "CRD") and in-core monitoring system, all of which are not shown, are removed from a RPV 1. Desirably, a temporary pipe system 21 is installed without draining the reactor water.

The temporary pipe system 21 for chemical decontamination and electroless plating, a reductive decontamination agent injecting device 50 for injecting a reductive decontamination agent, such as oxalic acid, an oxidative decontamination agent injecting device 51 for injecting an oxidative decontamination agent, such as permanganic acid or potassium permanganate (hereinafter the reductive decontamination agent and the oxidative decontamination agent will be inclusively referred to as "chemical decontamination agents".), a pH adjustment agent injecting device 204 for injecting a pH adjustment agent, such as hydrazine, a cation exchange resin column 52 and a cation-and-anion exchange resin column 200 for adsorbing ions contained in chemical decontamination liquids, a drain valve 58 and a drain pipe 53 for draining a liquid from the pipes of the temporary pipe system 21, an electroless plating solution injecting device 8 for injecting an electroless plating solution into the temporary pipe system 21, a circulation pump 5 for circulating the chemical decontamination liquids and the electroless plating solution, a heater 23 for adjusting the temperature of the chemical decontamination liquids and the electroless plating solution, and a catalyst 59 (for example, a noble metal such as Pt, Ru or Rh, or activated charcoal carrying a noble metal) are installed.

A cooler 203 is disposed on the inlet side of the cation exchange resin column 52 and the cation-and-anion exchange resin column 200 to cool the chemical decontamination liquid before the same flows into the cation exchange resin column 52 and the cation-and-anion exchange resin column 200. A temporary ring 193 provided with a plurality of inlet ports 77 is held between the RPV 1 and a RPV flange 190. The RPV flange 191 and the temporary ring 193 are fastened to a RPV flange 192 with bolts, not shown, and one end of the temporary pipe system 21 is connected to the temporary ring 193. Lower ends of a CRD housing 194 and an in-core monitoring system housing (hereinafter referred to as "ICM housing") 195 are removed and the other end of the temporary pipe system 21 is connected to the RPV 1. When connecting the temporary pipe system 21 to the RPV 1, all valves 58, 201, 55, 56, 61, 60, 63, 71, 57, 205 and 54 are closed.

The interior of the RPV 1 is cleaned by a chemical decontamination process to remove corrosion products adhering to the inner surfaces of the RPV 1 and the pipes 2 of the reactor recirculation pipe system. The corrosion products include metals and metal oxides contaminated with radioactive species. The circulation pump 5 is started and the heater 23 is actuated to circulate water of a predetermined temperature of, for example, 90±5° C. through the system. After confirming that the water is controlled at the predetermined temperature, the valves 205, 54, 55, 56 and 61 are opened to inject a reductive decontamination agent, such as oxalic acid, and a pH adjustment agent, such as hydrazine, into the temporary pipe system 21 by the reductive decontamination agent injecting device 50 and the pH adjustment agent injecting device 204, respectively, for a reductive decontamination process. During the reductive decontamination process, it is desirable that the pH of the chemical decontamination liquid is on the order of 2.5.

Since the circulation pump 5 is in operation, the oxidative decontamination agent is circulated through the temporary pipe system 21, the RPV 1, the CRD housing 194, the ICM housing 195, the circulation pump 5, the cation exchange resin column 52 and the heater 23 in that order. It is further desirable to achieve efficient reductive decontamination by operating recirculation pumps 3 to circulate the reductive decontamination agent in the RPV 1 through the pipes 2 of the reactor recirculation pipe system. Corrosion products removed from the RPV 1 and the pipes 2 of the recirculation pipe system are removed by the cation exchange resin column 52.

After the completion of the reductive decontamination process, the reductive decontamination agent, such as oxalic acid, and the pH adjustment agent, such as hydrazine, are decomposed by a reductive decontamination agent decomposing process. The valves 205, 54 and 61 are closed, and the valves 60 are opened. Then, the valve 63 is opened and hydrogen peroxide contained in a hydrogen peroxide tank, not shown, is injected through a hydrogen peroxide supply port 62 into the temporary pipe system 21. The reductive decontamination agent, such as oxalic acid, and the pH adjustment agent, such as hydrazine, are decomposed by the agency of the hydrogen peroxide injected into the temporary pipe system 21 and the catalyst 59. Carbon dioxide and nitrogen produced by the decomposition of the reductive decontamination agent and the pH adjustment agent are discharged outside the system through an existing vent line, not shown, connected to the RPV flange 190.

After the reductive decontamination agent has been decomposed, the valves 55, 63 and 60 are closed, the valves 201 and 61 are opened to make the system water flow through the cation-and-anion exchange resin column 200 to remove anions including chromate ions which could not have been removed by the cation exchange resin column 52 by the cation-and-anion exchange resin column 200. After thus cleaning the system water, an oxidative decontamination process is started.

The valve 201 is closed and the valves 61 and 57 are opened. The circulation pump 5 and the recirculation pumps 3 are kept operating, and an oxidative decontamination agent, such as permanganic acid or potassium permanganate, is injected into the temporary pipe system 21 by the oxidative decontamination agent injecting device 51. After the completion of the oxidative decontamination process, the valve 57 is closed, the valve 54 is opened to decompose the oxidative decontamination agent, such as permanganic acid or potassium permanganate, by oxalic acid by an oxidative decontamination agent decomposing process. Carbon dioxide produced by the decomposition of the oxidative decontamination agent is discharged outside the system through the vent line, not shown, connected to the RPV flange 190.

After the oxidative decontamination agent has been decomposed, the reductive decontamination process and the reductive decontamination agent decomposing process are carried out again. After the reductive decontamination agent decomposing process has been completed, the valves 55 are closed and the valves 201 are opened to remove anions including chromate ions which could not have been removed by the cation exchange resin column 52 by the cation-and-anion exchange resin column 200 for the final cleaning of the system water.

After the completion of a chemical decontamination process including the steps of reductive decontamination→reductive decontamination agent decomposition→cleaning→oxidative decontamination→oxidative decontamination agent decomposition→reductive decontamination→reductive decontamination agent decomposition→final cleaning, an electroless plating solution injecting process is started. After the final cleaning of the system water, the system water is analyzed to determine the electric conductivity and the concentration of ions of impurities of system water. If the quality of the system water does not meet a predetermined standard, the system water may be discharged outside the system through the drain pipe 53 by opening the drain valve 58.

Then, the electroless plating process is carried out. The valves 71, 56 and 61 are opened and an electroless plating solution is injected into the temporary pipe system 21 by the electroless plating solution injecting device 8 to supply the same into the RPV 1. The circulation pump 5 is operated to circulate the electroless plating solution through the temporary pipe system 21, the RPV 1, the CRD housing 194, the ICM housing 195, the circulation pump 5 and the heater 23 in that order. Since the electroless plating solution can be circulated in the RPV 1 through the pipes 2 of the reactor recirculation pipe system, plated films of a uniform thickness can be uniformly formed on the surfaces of the reactor internal components by electroless plating. Electroless plating process temperature is regulated by the heater 23. In this embodiment, the most desirable electroless plating process temperature is 90° C. The electroless plating solution of the regulated temperature is circulated by the recirculation pumps 3 and the circulation pump 5 for the electroless plating of the surfaces of the reactor internal components that can be wetted with the electroless plating solution.

The electroless plating solution is a suspension prepared by mixing $ZrO_2$ particles into an aqueous solution of nickel sulfate, sodium acetate and sodium hypophosphite. The respective concentrations of the chemicals are determined so that one liter of the electroless plating solution (water) contains 30 g of nickel sulfate ($NiSO_4.6H_2O$), 10 g of sodium acetate, 10 g of sodium hypophosphite and 25 g of zirconium oxide ($ZrO_2$) particles of 1 $\mu$m in mean particle size. Plating time is 5 h. Nickel nitrate may be used instead of nickel sulfate for the same effect.

Particles of $Al_2O_3$, $SiO_2$, $CeO_2$ or $ThO_2$ may be used instead of $ZrO_2$ particles. The composition of the electroless plating solution may be adjusted according to plating conditions regardless of above-described electroless plating solution. The electroless plating solution may be Nimuden LPX® (electroless Ni plating solution commercially available from Uemura Kogyo K.K.) may be used.

After the completion of the electroless plating process, the drain valve 58 is opened to drain the electroless plating solution through the drain pipe 53 into a processing apparatus, not shown. Then, the temporary pipe system 21 is removed and the RPV 1 is restored to its original condition.

After the completion of regular inspection, the BWR nuclear power plant is operated for rated operation. During the rated operation of the BWR nuclear power plant, the surface of the plated Ni layer formed by the electroless plating process is exposed to hot reactor water of about 280° C. and the surface of the plated Ni layer is oxidized.

Thus the plated Ni layer formed on the surfaces of the internal components is converted into a highly corrosion-resistant, dense layer of a complex oxide of spinel structure of Ni and Fe (nickel ferrite, $NiFe_2O_4$). $ZrO_2$ particles of 1 $\mu$m in mean particle size contained in the plated Ni layer are electric insulating oxide particles having an resistivity $10^5$ (100000) times that of $NiFe_2O_4$ or above and about $10^9$ (1000000000) times that of the reactor internal components or above, and a lattice anion diffusing property. Thus, the oxide film capable of reducing the ECP of the reactor internal components for a long period of time and of inhibiting the adhesion of radioactive substances to the surfaces of the reactor internal components can be formed on the surfaces of the reactor internal components by electroless plating.

This embodiment uses the temporary pipe system 21 for both electroless plating and chemical decontamination. Separate temporary pipe systems may be used respectively for electroless plating and chemical decontamination. A temporary pipe system may be used first for chemical decontamination, and the same temporary pipe system may be used after modification for electroless plating. Since chemical decontamination that is carried out before electroless plating removes corrosion products formed on the surfaces of the reactor internal components, uniform plated layers can be formed on the surfaces of the reactor internal components by electroless plating. The thus formed plated layers are more effective in suppressing the adhesion of radioactive substances on the surfaces of the reactor internal components and on reducing ECP than plated layers formed by electroless plating without decontaminating the surfaces of reactor internal components by chemical decontamination. When forming plated layers again by electroless plating on the surfaces of the same reactor internal components, the first reductive decontamination process may be omitted and the surfaces of the reactor internal components may be decontaminated by only the oxidative decontamination process and the second reductive decontamination process because oxide films are formed scarcely on the layers formed by electroless plating.

Since this embodiment plates the surfaces of the reactor internal components by electroless plating, the reactor internal components need not be provided with electrodes for electroplating and any current does not need to be supplied to the reactor internal components. Therefore, components to be plated do not need to be isolated from those not to be plated. Adverse effect of electric currents on measuring instruments can be prevented.

Second Embodiment

Figure 2:
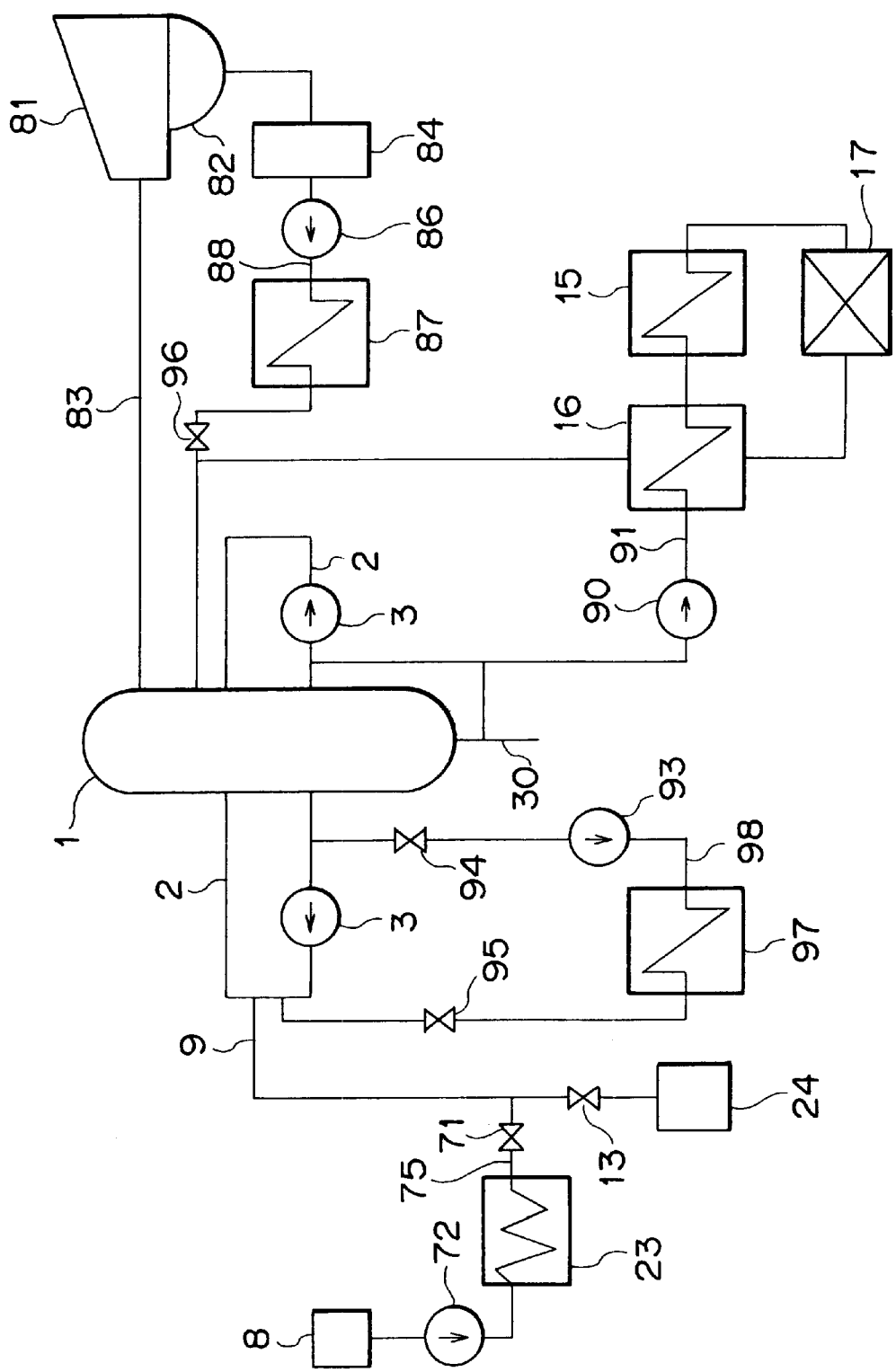
FIG. 2 is a diagrammatic view of a BWR (boiling water reactor) nuclear power plant in a second embodiment according to the present invention.

A BWR nuclear power plant to which the present invention is applied will be described with reference to FIG. 2. Steam generated in a RPV 1 is supplied through a main steam pipe 83 to a turbine 81. The steam discharged from the turbine 81 is condensed in water by a condenser 82. The water is pumped by a pump 86 to feed the same as feedwater through a feed pipe 88 into the RPV 1. The feedwater flowing through the feed pipe 88 is purified by a condensate purifier 84 placed in the feed pipe 88 and is heated by a feedwater heater 87. When a pump 90 is operated, reactor water contained in the RPV 1 flows through a reactor purifying system pipe 91, a regenerative heat exchanger 16, a nonregenerative heat exchanger 15, a demineralizing device 17 and the regenerative heat exchanger 16 in that order and returns through the feed pipe 88 into the RPV 1. The demineralizing device 17 purifies the reactor water. The regenerative heat exchanger 16, the nonregenerative heat exchanger 15, the demineralizing device 17, the pump 90 and the reactor purifying system pipe 91 constitute a reactor purifying system.

When recirculation pumps 3 are operated, the reactor water contained in the RPV 1 circulates through recirculation pipes 2 of a recirculation pipe system. Thus, the reactor water is circulated through the reactor. The recirculation pumps 3 and the recirculation pipes 2 constitutes a recirculation system. A sampling pipe 9 is connected to the recirculation pipe 2. The sampling pipe 9 is provided with a valve 13 and is connected to a water quality monitoring instrument 24. The valve 13 is opened to supply the reactor water to the water quality monitoring instrument 24 for quality measurement. When the RPV 1 is stopped, an inlet valve 94 and an outlet valve 95 are opened and a pump 93 is operated to cool the reactor water. When the pump 93 is operated, the reactor water is supplied through a residual heat removing system pipe 98 to a heat exchanger 97 to cool the reactor water. The cooled reactor water is returned through the recirculation system pipe 2 into the RPV 1. The pump 93, the heat exchanger 97 and the residual heat removing system pipe 98 constitute a residual heat removing system. A bottom drain pipe 30 is connected to the bottom of the RPV 1 to drain liquids from the RPV 1. This embodiment injects an electroless plating solution into the reactor water through a drain port formed in the sampling pipe 9.

Steps of the method in the second embodiment will be described hereinafter. In the regular inspection of the BWR nuclear power plant, all the fuel assemblies, control rods, control rod driving mechanism (hereinafter abbreviated to "CRD") and in-core monitoring system, all of which are not shown, are removed. The reactor water is drained from the RPV 1. An electroless plating solution injecting pipe 75 is connected to the drain port formed in the sampling pipe 9. Connected to the electroless plating solution injecting pipe 75 are an electroless plating solution injecting device 8, a pump 72 an electric heater 23 and a valve 71. The valve 13 is closed to prevent the flow of the electroless plating solution into the water quality monitoring instrument 24.

The valve 71 is opened and the pump 72 is started to inject the electroless plating solution into the RPV 1. The electroless plating solution is the same as that employed in the first embodiment. Then, the recirculation pumps 3 are started. Thus, surfaces of reactor internal components wetted with the electroless plating solution are plated by electroless plating. Since the electroless plating solution can be circulated in the RPV 1 by using the recirculation system pipes 2, plated films of a uniform thickness can be uniformly formed on the surfaces of the reactor internal components by an electroless plating process.

After the completion of the electroless plating process, the used electroless plating solution is drained off. The electroless plating solution injecting pipe 75, the electroless plating solution injecting device 8, the pump 72 and the electric heater 23 are disconnected from the sampling pipe 9 and the RPV 1 is restored to its original condition. After the completion of regular inspection, the BWR nuclear power plant is operated for rated operation. During the rated operation of the BWR nuclear power plant, the surface of the plated layer formed by the electroless plating process is exposed to hot reactor water of about 280° C. and the surface of the plated layer is oxidized.

The second embodiment exercises the same effect as the first embodiment. Since the sampling pipe 9 is used for injecting the electroless plating solution into the RPV 1, any temporary pipe system does not need to be connected to the RPV 1. Thus, the method in the second embodiment needs less steps than the method in the first method which connects the temporary pipe system to the RPV 1.

The electroless plating solution injecting pipe 75 may be connected to a vent hole or a sampling port formed in the sampling pipe 9. The electroless plating solution injecting pipe 75 may be connected to the residual heat removing system instead of connecting the same to the sampling pipe 9. When the electroless plating solution injecting pipe 75 is connected to the residual heat removing system, the valves 94 and 95 are opened and the pump 93 is operated to inject the electroless plating solution into the RPV 1. The pump 72 may be omitted when the pump 93 is used. Electroless plating may be carried out after chemical decontamination.

Third Embodiment

Figure 3:
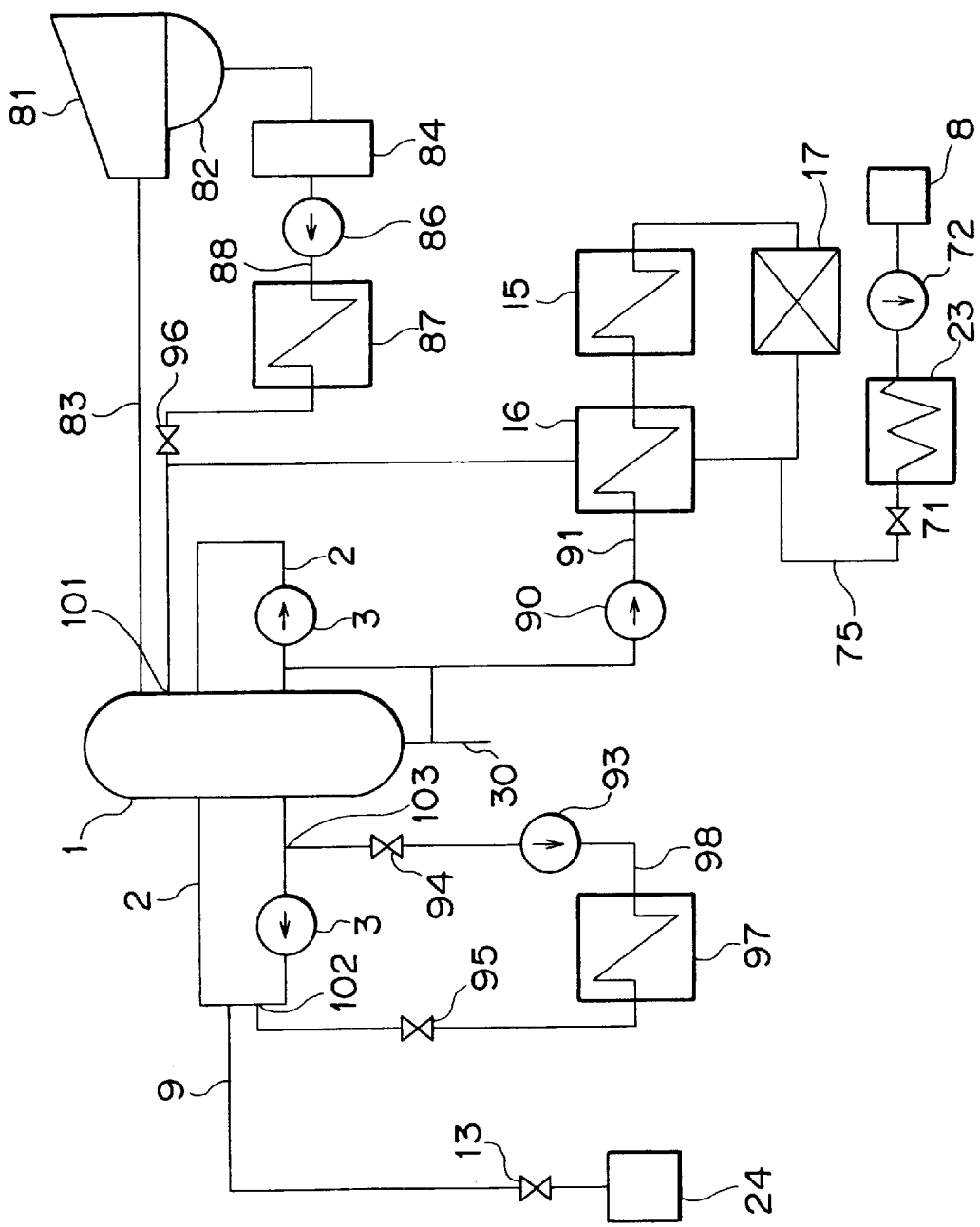
FIG. 3 is a diagrammatic view of a BWR nuclear power plant in a third embodiment according to the present invention.

A method in a third embodiment according to the present invention injects an electroless plating solution through a reactor purifying system pipe 91 during the regular inspection of a BWR nuclear plant. A BWR nuclear power plant to which the method in the third embodiment is applied is shown in FIG. 3. Components shown in FIG. 3 are the same as those shown in FIG. 2 and hence the description thereof will be omitted.

Steps of the method in a second embodiment according to the present invention will be described. In the regular inspection of a BWR nuclear power plant, reactor water contained in a RPV 1, a recirculation system pipes 2 and a reactor cleaning system pipe 91 is drained off and an electroless plating solution injecting pipe 75 is temporarily connected to a reactor cleaning system pipe 91. Connected to the electroless plating solution injecting pipe 75 are an electroless plating solution injecting device 8, a pump 72 an electric heater 23 and a valve 71. The valve 71 is opened and the pump 72 is started to inject an electroless plating solution into the reactor cleaning system pipe 91. The electroless plating solution is the same as that employed in the first embodiment. The valve 71 is closed after the electroless plating solution has been injected into the reactor cleaning system pipe 91. Then, the electroless plating solution flows through the reactor cleaning system pipe 91 and a feed pipe 88 into the RPV 1. A recirculation pump 3 and a pump 90 are started to circulate the electroless plating solution through the RPV 1, the recirculation system pipes 2 and the cleaning system pipe 91. Thus, the surfaces of the internal components of the RPV 1, and the inside surfaces of the recirculation system pipes 2 and the reactor cleaning system pipe 91 are plated by an electroless plating process.

After the completion of the electroless plating process, the used electroless plating solution is drained off, the electroless plating solution injecting pipe 75, the electroless plating solution injecting device 8, the pump 72 and the electric heater 23 are disconnected from the reactor cleaning system pipe 91 and the RPV 1 is restored to its original condition. After the completion of regular inspection, the BWR nuclear power plant is operated for rated operation. During the rated operation of the BWR nuclear power plant, the surface of the plated layer formed by the electroless plating process is exposed to hot reactor water of about 280° C. and the surface of the plated layer is oxidized.

The third embodiment exercises the same effect as the first embodiment. The internal components of the RPV 1, the recirculation system pipes 2 and the reactor cleaning system pipe 91 can be plated by the electroless plating process.

The electroless plating solution injecting pipe 75 may be connected to a part of the feed pipe 88 between a feed pump 86 and the outlet end 101 of the feed pipe 88, or to a residual heat removing system to inject the electroless plating solution into the RPV 1. Electroless plating may be carried out after chemical decontamination.

Fourth Embodiment

Figure 12:
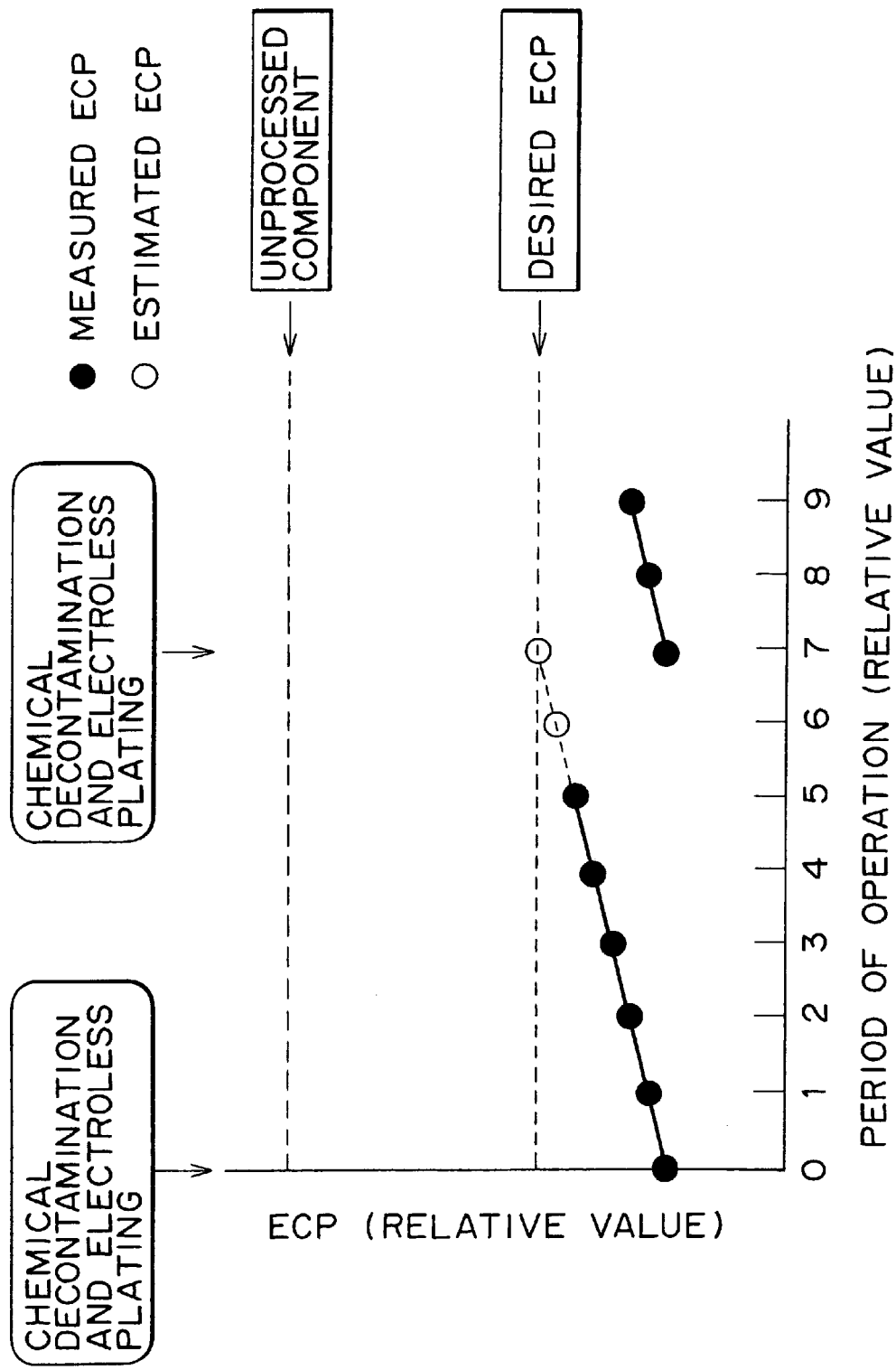
FIG. 12 is a graph showing estimated increase in ECP (electrochemical corrosion potential) in a fourth embodiment according to the present invention.

A method in a fourth embodiment according to the present invention measures ECP while a BWR nuclear plant is in operation, and estimates time when the next chemical decontamination process and the next electroless plating process are to be carried out on the basis of the variation of ECP. FIG. 12 shows the variation of measured ECPs with time. The ECP of a reactor internal component is measured during the normal operation of the BWR nuclear power plant after chemical decontamination and electroless plating. The ECP is measured by an ECP sensor attached to a reactor internal component, such as a LPRM (local power range monitoring system). The ECP is measured every three months.

An ECP measured immediately after chemical decontamination and electroless plating is lower than a desired ECP. The measured ECP increases gradually with time of operation of the BWR nuclear power plant. Time when the measured ECP exceeds the desired ECP is estimated by extrapolation using a graph showing the variation of the measured ECP with time. This embodiment carries out the chemical decontamination process and the electroless plating process twenty-one months after the start of measurement of ECP. The chemical decontamination process and the electroless plating process are carried out by the method in the first embodiment at the estimated time to reduce ECP. Thus, the chemical decontamination process and the electroless plating process are repeated to maintain the measured ECP below the desired ECP. The chemical decontamination process and the electroless plating process may be carried out by the method in the second embodiment or the method in the third embodiment, instead of by the method in the first embodiment.

The foregoing embodiments uses $ZrO_2$ particles of 1 μm in mean particle size. A further uniform, dense plated layer can be formed if $ZrO_2$ particles of smaller mean particle size are used. Particles of inorganic electrical insulating substance or an oxide having a lattice anion diffusing property, such as $TiO_2$, $Al_2O_3$, $SiO_2$, $CeO_2$ or $ThO_2$, may be used for the same effect instead of $ZrO_2$ particles. The electroless plating solution may contain stabilized zirconia particles prepared by adding a stabilizer, such as CaO or $Y_2O_3$, to $ZrO_2$ particles. When stabilized zirconia particles are used, a stable oxide having an electrical insulating property or a lattice anion diffusing property can be formed, and voids for oxygen ions increases ion conductivity, which further enhances the ECP reducing effect of the plated layer.

Although the foregoing embodiments have been described as applied to a BWR nuclear plant, the present invention is applicable also to processing the reactor internal components of an advanced boiling water rector nuclear power plant (ABWR nuclear power plant) including an internal pump by the electroless plating process. Moreover, the present invention may be applied to processing the reactor internal components of a pressurized water reactor nuclear power plant (PWR) including a primary cooling pipe system and a reactor vessel.

The plated layer may be formed by electroless plating on the reactor internal components by removing the reactor internal components from the RPV of the nuclear power plant and dipping the same in an electroless plating solution instead of injecting the electroless plating solution into the RPV of the nuclear power plant. The surfaces of new reactor internal components may be plated by the foregoing electroless plating process before incorporating the new reactor internal components into the RPV. When constructing a new nuclear power plant, new reactor internal components may be plated by the foregoing electroless plating process and the plated new reactor internal components may be used for constructing the nuclear power plant. Rector internal components removed from the RPV of a nuclear power plant and new reactor internal components may be plated by either an electroless plating process or an electroplating process.

Although the foregoing methods are able to reduce ECP without requiring hydrogen injection, ECP may be reduced by hydrogen injection when the ECP reducing effect of the plated layer is reduced due to the separation of the plated layer from the reactor internal components. An electroless plating solution may be poured into cracks and stress-corrosion cracks to reduce ECP.

The foregoing embodiments have a remarkable ECP reducing effect on reactor internal components of a plurality of kinds of materials including a stainless steel, such as SUS304 (JIS), a nickel-base alloy and a carbon steel.

The foregoing embodiments are capable of reducing the ECP of the internal structural components of a nuclear power plant regardless of whether hydrogen is injected into reactor water.

Fifth Embodiment

Figure 15:
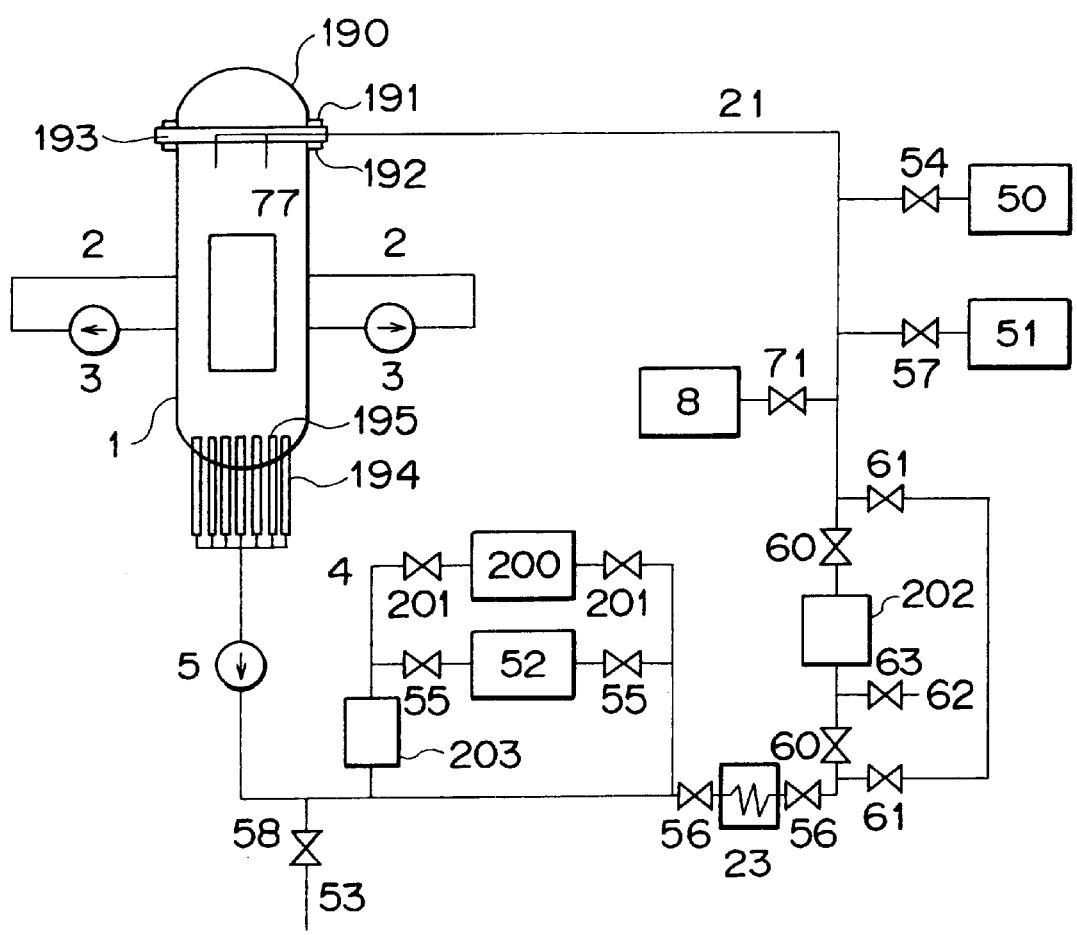
FIG. 15 is a diagrammatic view of a temporary electroless plating pipe system to be used by a fifth embodiment according to the present invention.

FIG. 15 is a diagrammatic view of a temporary electroless plating pipe system to be used by a fifth embodiment according to the present invention. A chemical decontamination process of the fifth embodiment differs from that of the first embodiment. The fifth embodiment is substantially the same as the first embodiment in other respects and hence the description of steps of the fifth embodiment similar to those of the first embodiment will be omitted.

The steps of the method will be explained. In the regular inspection of a BWR nuclear power plant, all the fuel assemblies, control rods, control rod driving mechanism (CRD) and in-core monitoring system, all of which are not shown, are removed from a RPV 1. Desirably, a temporary pipe system 21 is installed without draining the reactor water.

The temporary pipe system 21 for chemical decontamination and electroless plating, a reductive decontamination agent injecting device 50 for injecting a reductive decontamination agent, such as oxalic acid, an oxidative decontamination agent injecting device 51 for injecting an oxidative decontamination agent, such as permanganic acid, a cation exchange resin column 52 and a cation-and-anion exchange resin column 200 for adsorbing ions contained in chemical decontamination liquids (the reductive decontamination agent and the oxidative decontamination agent), a drain valve 58 and a drain pipe 53 for draining a liquid from pipes of the temporary pipe system 21 when necessary, an electroless plating solution injecting device 8 for injecting an electroless plating solution into the temporary pipe system 21, a circulation pump 5 for circulating the chemical decontamination liquids and the electroless plating solution, a heater 23 for adjusting the temperature of the chemical decontamination liquids and the electroless plating solution, and an ultraviolet radiating device 202 that radiates ultraviolet rays to decompose the reductive decontamination agent are installed. A cooler 203 is disposed on the inlet side of the cation exchange resin column 52 and the cation-and-anion exchange resin column 200 to cool the chemical decontamination liquid before the same flows into the cation exchange resin column 52 and the cation-and-anion exchange resin column 200.

A temporary ring 193 provided with a plurality of inlet ports 77 is held between the RPV 1 and a RPV flange 190. The RPV flange 191 and the temporary ring 193 are fastened to a RPV flange 192 with bolts, not shown, and one end of the temporary pipe system 21 is connected to the temporary ring 193. Lower ends of a CRD housing 194 and an in-core monitoring system housing (ICM housing) 195 are removed and the other end of the temporary pipe system 21 is connected to the RPV 1. When connecting the temporary pipe system 21 to the RPV 1, all valves 58, 201, 55, 56, 61, 60, 63, 71, 57 and 54 are closed.

The interior of the RPV 1 is subjected to chemical decontamination to remove corrosion products adhering to the inner surfaces of the RPV 1 and recirculation system pipes 2. The corrosion products include metals contaminated with radioactive species and metal oxides. The circulation pump 5 is operated to circulate water heated at a predetermined temperature of, for example, $90 \pm 5°$ C. by the heater 23.

After confirming that the water is heated at the predetermined temperature, the valves 54, 55, 56 and 61 are opened and a reductive decontamination agent, such as oxalic acid, is injected into the temporary pipe system 21 by the reductive decontamination agent injecting device 50.

Since the circulation pump has been already started, the reductive decontamination agent flows through the temporary pipe system 21, the RPV 1, a CRD housing 194, an ICM housing 195, the circulation pump 5, the cation exchange resin column 52 and the heater 23 in that order. Preferably, recirculation pumps 3 are operated also. Since the reductive decontamination agent can be circulated through the RPV 1 by using recirculation system-pipes 2 when the recirculation pumps 3 are operated, reductive decontamination can be efficiently achieved. Corrosion products removed from the RPV 1 and the recirculation system pipes 2 are removed by the cation exchange resin column 52 due to reductive decontamination.

After the completion of reductive decontamination, the reductive decontamination agent, such as oxalic acid, is decomposed. The valves 54 and 61 are closed and the valve 60 is opened. Then, the valve 63 is opened to inject hydrogen peroxide contained in a hydrogen peroxide tank, not shown, through a hydrogen peroxide injection port 62 into the temporary pipe system 21. The reductive decontamination agent, such as oxalic acid, is decomposed by the agency of the hydrogen peroxide and ultraviolet rays radiated by the ultraviolet radiating device 202. Carbon dioxide produced when the reductive decontamination agent is decomposed is discharged outside the system through an existing vent line, not shown, connected to the RPV flange 190.

After the completion of decomposition of the reductive decontamination agent, the valves 55, 63 and 60 are closed and the valves 201 and 61 are opened to clean the system water by removing anions including chromate ions which could not have been removed by the cation exchange resin column 52 by the cation-and-anion exchange resin column 200. After thus cleaning the system water, an oxidative decontamination process is started. The valve 201 is closed and the valve 57 is opened. The circulation pump 5 and the recirculation pumps 3 are kept operating, and an oxidative decontamination agent, such as permanganic acid, is injected into the temporary pipe system 21 by the oxidative decontamination agent injecting device 51.

After the completion of the oxidative decontamination process, the valve 57 is closed, the valve 54 is opened to decompose the oxidative decontamination agent, such as permanganic acid, by oxalic acid by an oxidative decontamination agent decomposing process. Carbon dioxide produced by the decomposition of the oxidative decontamination agent is discharged outside the system through the vent line, not shown, connected to the RPV flange 190. After the oxidative decontamination agent has been decomposed, the reductive decontamination process and the reductive decontamination agent decomposing process are carried out again. After the reductive decontamination agent decomposing process has been completed, the valves 55 are closed and the valves 201 are opened to remove anions including chromate ions which could not have been removed by the cation exchange resin column 52 by the cation-and-anion exchange resin column 200 for the final cleaning of the system water.

After the completion of a chemical decontamination process including the steps of reductive decontamination→reductive decontamination agent decomposition→cleaning→oxidative decontamination→oxidative decontamination agent decomposition→reductive decontamination→reductive decontamination agent decomposition→final cleaning, an electroless plating solution injecting process is started. After the final cleaning of the system water, the system water is analyzed to determine the electric conductivity and the concentration of ions of impurities of system water, not shown. If the quality of the system water does not meet a predetermined standard, the system water may be discharged outside the system through the drain pipe 53 by opening the drain valve 58. When carrying out the electroless plating process again, the first reductive decontamination of the decontamination process may be omitted and the decontamination process may be simplified by carrying out only oxidative decontamination→reductive decontamination.

What is claimed is:

1. A method of surface-treating structure components of a nuclear power plant, said method comprising wetting the surfaces of the structural components of the nuclear power plant to be exposed to reactor water with an electroless plating solution containing at least either an electrical insulting substance or an oxide having a lattice oxygen anion diffusing property for reducing electrochemical corrosion potential.

2. The method of surface-treating structural components of a nuclear power plant according to claim 1, wherein the structural components are wetted with the electroless plating solution after being processed by a chemical decontamination process using a chemical decontamination liquid.

3. The method of surface-treating structural components of a nuclear power plant according to claim 2, wherein the electroless plating solution is prepared by injecting component substances of the electroless plating solution into the reactor water cleaned by decomposing the chemical decomposition liquid.

4. The method of surface-treating structural components of a nuclear power plant according to claim 1, wherein the electrical insulating substance or the oxide is particles selected from zirconia, alumina, titania, silica, ceria or thoria.

5. The method of surface-treating structural components of a nuclear power plant according to claim 4, wherein the particles of the electrical insulating substance or the oxide has a mean particle diameter in the range of 0.1 to 3 $\mu$m.

6. The method of surface-treating structural components of a nuclear power plant according to claim 1, wherein the structural components of the nuclear power plant are a reactor vessel and reactor internal components disposed in the reactor vessel, and the electroless plating solution is injected into the reactor vessel.

7. The method of surface-treating structural components of a nuclear power plant according to claim 6, wherein the electroless plating solution is injected into the reactor vessel through at least one of a recirculation system, a reactor cleaning system and a residual heat removing system.

8. The method of surface-treating structural components of a nuclear power plant according to claim 1, wherein after forming a metal film on the surfaces of the structural components of the nuclear power plant by wetting the surfaces of the structural components with the electroless plating solution, exposing the metal film to water of 100° C. or above.

9. The method of surface-treating structural components of a nuclear power plant according to claim 1, wherein the structural components of the nuclear power plant are installed in the nuclear power plant or removed from the nuclear power plant.

10. A method of surface-treating structural components of a nuclear power plant, said method comprising wetting the surfaces of the structural components of the nuclear power plant to be exposed to reactor water with an electroless plating solution containing at least either an electrical insulating substance or an oxide having a lattice oxygen anion diffusing property for reducing electrochemical corrosion potential after processing the structural components by a chemical decontamination process.

11. The method of surface-treating structural components of a nuclear power plant according to claim 10, wherein the electrical insulating substance or the oxide is particles selected from zirconia, alumina, titania, silica, ceria or thoria.

12. The method of surface-treating structural components of a nuclear power plant according to claim 11, wherein the particles of the electrical insulating substance or the oxide has a mean particle diameter in the range of 0.1 to 3 $\mu$m.

13. The method of surface-treating structural components of a nuclear power plant according to claim 10, wherein the electroless plating solution is prepared by injecting component substances of the electroless plating solution into the reactor water cleaned by decomposing the chemical decomposition liquid.

14. The method of surface-treating structural components of a nuclear power plant according to claim 10, wherein the structural components of the nuclear power plant are a reactor vessel and reactor internal components, and the electroless plating solution is injected into the reactor vessel.

15. The method of surface-treating structural components of a nuclear power plant according to claim 14, wherein the electroless plating solution is injected into the reactor vessel through at least one of a recirculation system, a reactor cleaning system and a residual heat removing system.

16. The method of surface-treating structural components of a nuclear power plant according to claim 10, wherein after forming a metal film on the surfaces of the structural components of the nuclear power plant by wetting the surfaces of the structural components with the electroless plating solution, exposing the metal film to water of 100° C. or above.

17. A method of surface-treating structural components of a nuclear power plant, said method comprising disposing an electroless plating solution supply system having an injection nozzle for injecting an electroless plating solution containing at least either an electrical insulating substance or an oxide having a lattice oxygen anion diffusing property between a reactor vessel and a reactor vessel flange, and injecting the electroless plating solution into the reactor vessel for reducing electrochemical corrosion potential by the electroless plating solution supply system.

* * * * *